(12) United States Patent
Peil et al.

(10) Patent No.: US 6,479,599 B1
(45) Date of Patent: *Nov. 12, 2002

(54) CATALYST SYSTEM FOR HIGH YIELD SYNTHESIS OF POLYOLEFINS

(75) Inventors: Kevin P. Peil, Auburn, MI (US); David R. Wilson, Midland, MI (US)

(73) Assignee: BP Chemicals Limited, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/381,664

(22) PCT Filed: Mar. 30, 1998

(86) PCT No.: PCT/US98/06271

§ 371 (c)(1),
(2), (4) Date: Sep. 17, 1999

(87) PCT Pub. No.: WO98/45337

PCT Pub. Date: Oct. 15, 1998

Related U.S. Application Data

(60) Provisional application No. 60/042,638, filed on Apr. 4, 1997.

(51) Int. Cl.$^7$ ............... C08F 4/44; C08F 110/14; B01J 31/38

(52) U.S. Cl. ............... 526/127; 526/75; 526/114; 526/160; 526/133; 526/905; 526/943; 526/348.5; 526/348.6; 502/104; 502/117; 502/152

(58) Field of Search ............... 526/160, 161, 526/172, 943, 127, 133, 134, 75, 348.5, 348.6, 905; 502/104, 117, 152, 113, 114

(56) References Cited

U.S. PATENT DOCUMENTS

| 4,543,399 A | 9/1985 | Jenkins, III et al. | 526/70 |
| 4,912,075 A | * 3/1990 | Chang | 502/107 |
| 5,352,749 A | 10/1994 | DeChellis et al. | 526/68 |

FOREIGN PATENT DOCUMENTS

| EP | 89691 | 9/1983 |
| WO | WO 94/25495 | 11/1994 |
| WO | WO 94/28032 | 12/1994 |
| WO | WO 95/00526 | * 1/1995 |
| WO | WO 95/10542 | 4/1995 |
| WO | WO 95/14044 | 5/1995 |
| WO | WO 96/28480 | 9/1996 |

* cited by examiner

*Primary Examiner*—David W. Wu
*Assistant Examiner*—R. Harlan
(74) *Attorney, Agent, or Firm*—Finnegan, Henderson, Farabow, Garrett and Dunner, L.L.P.

(57) ABSTRACT

This invention relates to a supported metallocene catalyst system for the high yield synthesis of polyolefins, to methods of preparation of the catalyst system, to polymerization processes which use the catalyst system and to polyolefin polymers produced by the polymerization processes.

57 Claims, No Drawings

CATALYST SYSTEM FOR HIGH YIELD SYNTHESIS OF POLYOLEFINS

RELATED APPLICATION

This application claims the benefit under 35 U.S.C. §119 (e) of Provisional Application No. 60/042,638 file Apr. 4, 1997 and is the national phase of PCT/US98/06271, filed Mar. 30, 1997.

FIELD OF THE INVENTION

This invention relates to a supported metallocene catalyst system for the high yield synthesis of polyolefins, to methods of preparation of the catalyst system, to polymerization processes which use the catalyst system and to polyolefin polymers produced by the polymerization processes.

BACKGROUND OF THE INVENTION

Recently there have been a number of advances in the production of polyolefin copolymers due to the introduction of metallocene catalysts. Metallocene catalysts offer a number of advantages including improved activity compared to traditional Ziegler catalysts under a given set of conditions. Also, metallocene catalysts are often described as being single-site in nature. Because of this single-site nature, the polyolefins produced with these catalysts are often very uniform in their molecular structure.

In order for metallocene catalysts to be commercially useful as supported catalysts in a gas phase, solution or slurry process, the catalysts employed preferably are highly active. High productivity of the catalyst in a polymerization processes is desired to reduce catalyst costs and to avoid the expense of catalyst residue removal procedures. Thus, the catalyst residue in the polymer must be low enough that it can be left in the polymer without causing any undue problems to either the resin manufacturer, or to a party fabricating articles from the resin, or to an ultimate user of such fabricated articles. When a highly active catalyst is used in a gas phase, solution or slurry process, the transition metal content of the polymer should be on the order of less than 1 part per million (ppm) of transition metal at a productivity level of greater than 1,000,000 pounds of polymer per pound of transition metal, One of the features of a gas phase polymerization reactor is that the gas velocity in the reactor is limited to prevent excess carry-over of the solid particles from the fluid bed, which would happen if the velocity is set too high. If the gas velocity is set too low, reactor fouling may occur due to fallout of polymer from the bed. Since the gas velocity is limited, the amount of heat which can be removed when operating at a given set of conditions is also limited. The limitations on heat removal place limitations on the rate of productivity for a given reactor. Attempts at improving the productivity of a gas phase reactor by increasing the catalyst feed rate will often not be met with success because of the heat removal limitations of the reactor.

A major improvement in reactor output and a partial solution to the heat removal limitations is described in U.S. Pat. Nos. 4,543,399, 5,352,749, EP 89691, WO 94/25495 and WO 94/28032, which are hereby incorporated by reference, where a volatile liquid is fed to the reactor. The volatile liquid evaporates in the hot fluidized bed to form a gas which mixes with the fluidizing gas. The evaporated liquid exits the top of the reactor as part of the recycle gas and passes through the heat exchange part of the recycle loop. The evaporated liquid condenses in the heat exchanger and is then feed to the reactor as a volatile liquid.

In practice, in the gas phase commercial copolymers are made using monomers having 2 to 8 carbon atoms because of the lower concentrations possible in the reactor for alpha-olefins with greater carbon numbers. Traditional Ziegler catalysts are not particularly efficient or effective at incorporating the alpha-olefin comonomers having greater numbers of carbon atoms into the polymer. To date, highly active and highly efficient supported metallocene catalysts, which do have high rates of alpha-olefin comonomer incorporation into the polymer, have not been demonstrated.

Up to now, supported metallocene catalysts useful for producing polyolefin homopolymers and copolymers in gas phase and slurry processes have had reported catalyst efficiencies of less than 50,000,000 grams polymer/mole catalyst/hour for Zr based catalysts and 24,000,000 grams polymer/mole catalyst/hour for Ti based catalysts except when used with exceptionally high ratios of cocatalyst to catalyst. A variety of metallocene loadings and catalyst concentrations have been reported with no obvious trends. Indeed, due to the nonuniformity in the conventions used to report the data, and imprecision in the definitions of various terms in the disclosures, there appears to be little relationship between the use of various classes of metallocene complexes or any optimal ranges for the various process variables employed.

SUMMARY OF THE INVENTION

There is a need for a supported olefin polymerization catalyst system that can be used more efficiently, effectively and economically to polymerize olefins or to copolymerize ethylene or propylene with higher alpha-olefins having from about 3 to about 20 carbon atoms in gas phase and slurry processes.

We have made the surprising discovery that, for supported metallocene catalysts with a formulation having less than 25 $\mu$mol metallocene/gram support and a relatively low cocatalyst/catalyst ratio, the measured catalyst efficiencies are invariably greater than 50,000,000 grams polymer/mole catalyst/hour for Zr based catalysts and 24,000,000 grams polymer/mole catalyst/hour for Ti based catalysts and, in a preferred embodiment can be greater than about 50,000,000 grams polymer/mole catalyst/hour for Ti based catalysts. This phenomenon is independent of the choice of metallocene, the choice of cocatalyst, the choice of support and the method of preparation of the support or the method of preparation of the formulated catalyst or the method of activation of the catalyst or the method of injection of the formulated catalyst into the reactor.

In one embodiment, this invention provides a process for the polymerization of an olefin monomer, or of an olefin monomer and one or more comonomers, to produce a polymer, the process carried out in a polymerization reactor in the presence of a supported olefin polymerization catalyst system produced from catalyst components comprising:

1) a support material component comprising one or more dehydrated support materials;
2) a metallocene complex component comprising one or more metallocene complexes used in a total loading range of from about 0.1 to about 25 $\mu$mol of metallocene complex/gram of support material component;
3) an activator component comprising one or more activators used in a range of molar ratios of total moles of activator to total moles of metallocene complex of from about 0.5 to about 2.5;

where the catalyst system is used at a catalyst concentration in the range of from about $0.01 \times 10^{-6}$ to about $6 \times 10^{-6}$ moles of active catalyst/mole of monomer, and a catalyst efficiency results that is at least $2.4 \times 10^7$ g polymer/mol catalyst hour.

In another embodiment, this invention provides a process for the polymerization of an olefin monomer, or of an olefin monomer and one or more comonomers, to produce a polymer, the process carried out in a polymerization reactor in the presence of a supported olefin polymerization catalyst system produced from catalyst components comprising:

1) a support material component comprising one or more dehydrated support materials;
2) a metallocene complex component comprising one or more metallocene complexes all of which have as a central metal Ti used in a total loading range of from about 0.1 to about 25 μmol of metallocene complex/gram of support material component;
3) an activator component comprising one or more activators used in a range of molar ratios of total moles of activator to total moles of metallocene complex of from about 0.5 to about 2.5;

where a catalyst efficiency results that is at least $2.4 \times 10^7$ g polymer/mol catalyst/hour.

In another embodiment, this invention provides a process for the polymerization of an olefin monomer, or of an olefin monomer and one or more comonomers, to produce a polymer, the process carried out in a polymerization reactor in the presence of a supported olefin polymerization catalyst system produced from catalyst components comprising:

1) a support material component comprising one or more dehydrated support materials;
2) a metallocene complex component comprising one or more metallocene complexes having as a central metal Ti in which the formal oxidation state is +2 used in a total loading range of from about 0.1 to about 25 μmol of metallocene complex/gram of support material component;
3) an activator component;

where a catalyst efficiency results that is at least $2.4 \times 10^7$ g polymer/mol catalyst/hour.

Also provided by this invention is a supported olefin polymerization catalyst system produced from catalyst components comprising:

1) a support material componentcomprising one or more dehydrated support materials;
2) a metallocene complex component; and
3) an activator component;

where the metallocene complex component is used in a loading range of from about 0.1 to about 25 μmol/gram of support material component, the cocatalyst or activator component is used in a range of molar ratios to the metallocene complex component of from about 0.5 to about 2.5 and, when the catalyst system is used in a reactor to polymerize one or more olefin monomers to produce a polymer, the catalyst system is used at a catalyst concentration in the range of about $0.01 \times 10^{-6}$ to about $6 \times 10^{-6}$ moles of active catalyst/mole of monomer, and a catalyst efficiency results that is at least $2.4 \times 10^7$ g polymer/mole of catalyst/hour.

An important aspect of the process of this invention is that it provides a balance of various catalyst system elements with polymerization process elements, the results of which is that the catalyst efficiency of the catalyst system is improved and can be maximized. Accordingly, in one aspect of this invention, there is provided a process for maximizing the efficiency of a catalyst system for the polymerization of an olefin monomer, or of an olefin monomer and one or more comonomers, to produce a polymer, the process carried out in a polymerization reactor in the presence of a supported olefin polymerization catalyst system produced from catalyst components comprising:

1) a support material componentcomprising one or more dehydrated support materials;
2) a metallocene complex component; and
3) an activator component;

wherein the metallocene complex component is used in a loading range, in terms of mass of metallocene complex component relative to the mass of support material component, the activator component is used in a range of molar ratios of the activator component to the metallocene complex component, and the catalyst system is used in a range of catalyst concentrations, in a balanced manner to maximize the catalyst efficiency in terms of mass of polymer produced per mass of catalyst per hour.

In another embodiment this invention provides a catalyst system comprising:

a) a metallocene component comprising one or more metallocene complexes supported on individual metallocene supports or a common metallocene support; and
b) a cocatalyst component comprising one or more cocatalysts or activators supported on individual cocatalyst supports or a common cocatalyst support, where at least one of the cocatalysts or activators is a non-alumoxane nonionic cocatalyst or activator.

DETAILED DESCRIPTION

Table 1 gives data disclosed in various references, all of which are hereby incorporated by reference, related to the use of supported metallocene catalysts useful for producing polyolefin homo- and copolymers in gas phase, slurry and solution processes. Despite a variety of metallocene loadings ranging from 2 to 625 μmol/gram silica, and cocatalyst/catalyst ratios from 1.2 to greater than 400, and in reactor catalyst concentrations (where the reactor is defined as the combined volumes of the polymerization zone and freeboard for a fluid bed reactor or the combined volumes of the polymerization zone and head space for a slurry or solution reactor) from $0.2 \times 10\text{-}6$ to more than $200 \times 10^{-6}$ mole catalyst/mole monomer, the reported catalyst efficiencies are less than 24,000,000 grams polymer/mole catalyst/hour, except when a very high catalyst loading and/or a very high ratio of cocatalyst to catalyst has been used. From these references no apparent trends of interrelationship between these factors is evident.

TABLE 1

Selected gas phase art.

| Document | μmol metal/ g support | Cocatalyst/ catalyst range | mole catalyst/mole monomer × 10$^{-6}$ | gram polymer/mole catalyst/hour | Reactor type used for examples |
|---|---|---|---|---|---|
| US 5,466,649 | 50–112 μmol/g | >300 | unknown | 9.1–82 MM | gas phase |
| PCT 96/18661 | 55 μmol/g | >100 | 15.6 | <27.4 MM | slurry |
| US 5,470,993 | 8–33 & 625 μmol/g | 1.2–3.0 | >.26 | <24 MM | gas phase |
| US 5,405,922 | 44 & 65 μmol/g | >200 | unknown | 45–64 MM | gas phase |
| PCT 95/07942 | 8–94 μmol/g | 1.2–3.0 | >0.104 | <24 MM | gas phase |
| US 5,057,475 | 34–70 μmol/g | >100 | >217 | <3.6 MM | slurry |
| US 4,897,455 | 65–115 μmol/g | >20 | >43 | <9.1 MM | gas phase |
| PCT 94/03509 | 65 μmol/g | >200 | unknown | 13.7 MM | gas phase |
| PCT 94/03506 | 6 & 43 μmol/g | >20 | >82 | <13.7 MM | slurry |
| PCT 91/01337 | 63–67 μmol/g | >100 | unknown | <1.8 MM | gas phase |
| PCT 94/26793 | 51–54 μmol/g | >300 | >8.6 | <45.6 MM | slurry |
| PCT 94/21691 | 2 & 35 μmol/g | >200 | >.269 | 520 MM w/ 2 μm/g | slurry |
| US 5,362,824 | 68 μmol/g | >30 | unknown | 720–1186 MM | slurry |
| US 5,474,962 | 22–34 μmol/g | >250 | 34 | <18.2 MM | gas phase |
| US 5,124,418 | 66 μmol/g | >400 | 7 | <22.8 MM | gas phase |
| SRI report #174 | Ti-Mg Ziegler | N/A | 5.0 | 6,000 lb. PE/lb. catalyst | gas phase |
| EP 578,038 | 0.5–5.5 | 2000 | 7 | 9.1–36.5 MM | slurry |

All references herein to elements or metals belonging to a certain Group refer to the Periodic Table of the Elements published and copyrighted by CRC Press, Inc., 1989. Also any reference to the Group or Groups shall be to the Group or Groups as reflected in this Periodic Table of the Elements using the IUPAC system for numbering groups.

This invention provides a process for the polymerization of an olefin monomer, or of an olefin monomer and one or more comonomers, to produce a polymer, the process carried out in a polymerization reactor in the presence of a supported olefin polymerization catalyst system produced from catalyst components comprising: 1) a metallocene complex component; 2) an activator component; and 3) a support material component.

Suitable metallocene complexes for use in the metallocene complex component of this invention include any compound or complex of a metal of Groups 3–10 of the Periodic Table of the Elements capable of being activated to olefin insertion and polymerization by the presence of an activator or through the use of a method of activation. These metallocene complexes may be weak catalysts prior to activation, or they may exhibit no catalytic activity prior to activation. In the discussion herein, metallocene complexes subject to activation in the catalyst system of this invention may be referred to simply as catalysts. Examples include Group 10 diimine derivatives corresponding to the formula:

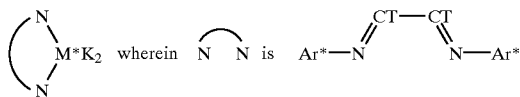

M* is Ni(II) or Pd(II);
K is hydrocarbyl;
Ar* is an aryl group, especially 2,6-diisopropylphenyl, 2,6-dimethylphenyl, 2,6-di-t-butylphenyl, or 2,6-diphenylphenyl; and
T independently each occurrence is selected from the group consisting of hydrogen, $C_{1-4}$ alkyl or phenyl, or two T groups together with the two carbon moieties form a fused ring system, especially a 1,8-naphthanediyl group.

Certain of the foregoing catalysts are disclosed by M. Brookhart, et al., in *J. Am. Chem. Soc.*, 118, 267–268 (1996) and *J. Am. Chem. Soc.*, 117, 6414–6415 (1995), as being active polymerization catalysts especially for polymerization of α-olefins, either alone or in combination with polar comonomers such as alkyl acrylates and alkyl methacrylates. In an embodiment of the present invention it has now been discovered that the foregoing catalysts also are effective for use in the polymerization of vinyl chloride monomer.

Additional catalysts include derivatives of Group 3, 4, 5, 6, 7, 8, or 9, or Lanthanide metals which are in the +2, +3, or +4 formal oxidation state. Preferred compounds include metal complexes containing from 1 to 3 π-bonded anionic or neutral ligand groups, which may be cyclic or noncyclic delocalized π-bonded anionic ligand groups. Exemplary of such π-bonded anionic ligand groups are conjugated or nonconjugated, cyclic or noncyclic dienyl groups, allyl groups, boratabenzene groups, and arene groups. By the term "π-bonded" is meant that the ligand group is bonded to the transition metal by means of a π bond.

Each atom in the delocalized π-bonded group may independently be substituted with a radical selected from the group consisting of hydrogen, halogen, hydrocarbyl, halohydrocarbyl, hydrocarbyl-substituted metalloid radicals wherein the metalloid is selected from Group 14 of the Periodic Table of the Elements, and such hydrocarbyl- or hydrocarbyl-substituted metalloid radicals further substituted with a Group 15 or 16 heteroatom containing moiety. Included within the term "hydrocarbyl" are $C_{1-20}$ straight, branched and cyclic alkyl radicals, $C_{6-20}$ aromatic radicals, $C_{720}$ alkyl-substituted aromatic radicals, and $C_{7-20}$ aryl-substituted alkyl radicals. In addition two or more such radicals may together form a fused ring system, a hydrogenated fused ring system, or a metallocycle with the metal. Suitable hydrocarbyl-substituted organo-metalloid radicals include mono-, di- and tri-substituted organometalloid radicals of Group 14 elements wherein each of the hydrocarbyl groups contains from 1 to 20 carbon atoms. Examples of suitable hydrocarbyl-substituted organometalloid radicals include trimethylsilyl, triethylsilyl, ethyldimethylsilyl, methyldiethylsilyl, triphenylgermyl, and trimethylgermyl groups. Examples of Group 15 or 16 heteroatom containing moieties include amine, phosphine, ether, or thioether moieties or divalent derivatives thereof, for example amide, phosphide, hydrocarbyloxy, hydrocarbylthio or thioether groups bonded to the transition metal or Lanthanide metal, and bonded to the hydrocarbyl group or to the hydrocarbyl-substituted metalloid-containing group.

Examples of suitable anionic, delocalized π-bonded groups include cyclopentadienyl, indenyl, fluorenyl, tetrahydroindenyl, tetrahydrofluorenyl, octahydrofluorenyl, pentadienyl, cyclohexadienyl, silacyclohexadienyl, allyl, dihydroanthracenyl, hexahydroanthracenyl, decahydroanthracenyl groups, and boratabenzene groups, as well as $C_{1-10}$ hydrocarbyl-substituted or $C_{1-10}$ hydrocarbyl-substituted silyl substituted derivatives thereof. Preferred anionic delocalized π-bonded groups are cyclopentadienyl, pentamethylcyclopentadienyl, tetramethylcyclopentadienyl, trimethylsilylcyclopentadienyl, indenyl, 2,3-dimethylindenyl, fluorenyl, 2-methylindenyl, 2-methyl-4-phenylindenyl, tetrahydrofluorenyl, octahydrofluorenyl, tetrahydroindenyl, cyclohexadienyl, and silacyclohexadienyl.

The boratabenzenes are anionic ligands which are boron containing analogues to benzene. They are previously known in the art having been described by G. Herberich, et al., in *Organometallics*, 14,1, 471–480 (1995). Preferred boratabenzenes correspond to the formula:

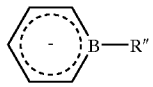

wherein R" is selected from the group consisting of hydrocarbyl, silyl, or germyl, said R" having up to 20 nonhydrogen atoms.

A suitable class of catalysts are transition metal complexes corresponding to the formula:

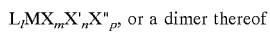

$L_lMX_mX'_nX''_p$, or a dimer thereof wherein:

L is an anionic, delocalized, π-bonded group that is bound to M, containing up to 50 nonhydrogen atoms, optionally two L groups may be joined together forming a bridged structure, and further optionally one L may be bound to X, or even further optionally one L may be bound to X';

M is a metal of Group 4 of the Periodic Table of the Elements in the +2, +3 or +4 formal oxidation state;

X is an optional, divalent substituent of up to 50 nonhydrogen atoms that together with L forms a metallocycle with M;

X' is an optional neutral Lewis base having up to 20 nonhydrogen atoms;

X" each occurrence is a monovalent, anionic moiety having up to 40 nonhydrogen atoms, optionally, two X" groups may be covalently bound together forming a divalent dianionic moiety having both valences bound to M, or, optionally 2 X" groups may be covalently bound together to form a neutral, conjugated or nonconjugated diene that is π-bonded to M (whereupon M is in the +2 oxidation state), or further optionally one or more X" and one or more X' groups may be bonded together thereby forming a moiety that is both covalently bound to M and coordinated thereto by means of Lewis base functionality;

1 is 0, 1 or 2;
m is 0 or 1;
n is a number from 0 to 3;
p is an integer from 0 to 3; and
the sum, 1+m+p, is equal to the formal oxidation state of M, except when 2 X" groups together form a neutral conjugated or nonconjugated diene that is π-bonded to M, in which case the sum 1+m is equal to the formal oxidation state of M.

Preferred complexes include those containing either one or two L groups. The latter complexes include those containing a bridging group linking the two L groups. Preferred bridging groups are those corresponding to the formula $(ER^*_2)_x$ wherein E is silicon, germanium, tin, or carbon, R* independently each occurrence is hydrogen or a group selected from silyl, hydrocarbyl, hydrocarbyloxy and combinations thereof, said R* having up to 30 carbon or silicon atoms, and x is 1 to 8. Preferably, R* independently each occurrence is methyl, ethyl, propyl, benzyl, tert-butyl, phenyl, methoxy, ethoxy or phenoxy. Preferably, x is 1or 2.

Examples of the complexes containing two L groups are compounds corresponding to the formula:

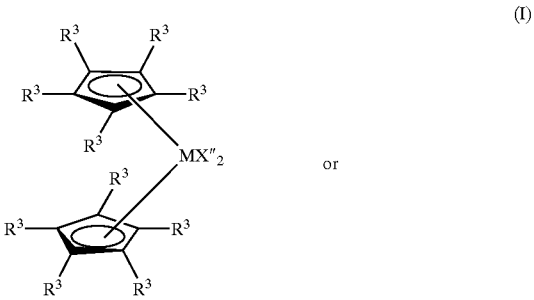

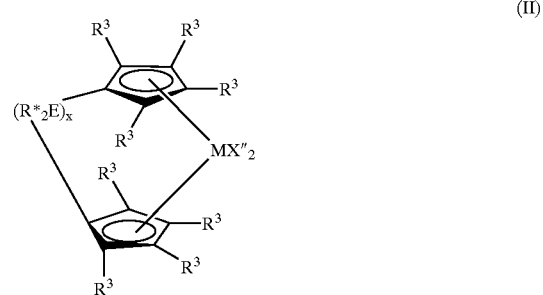

wherein:

M is zirconium, zirconium or hafnium, preferably zirconium or hafnium, in the +2 or +4 formal oxidation state;

$R^3$ in each occurrence independently is selected from the group consisting of hydrogen, hydrocarbyl, hydrocarbyloxy, silyl, germyl, cyano, halo and combinations thereof, (especially, hydrocarbyloxysilyl, halocarbyl, and halohydrocarbyl) said $R^3$ having up to 20 nonhydrogen atoms, or adjacent $R^3$ groups together form a divalent derivative (that is, a hydrocarbadiyl, siladiyl or germadiyl group) thereby forming a fused ring system, and X" independently each occurrence is an anionic ligand group of up to 40 nonhydrogen atoms, or two X" groups together form a divalent anionic ligand group of up to 40 nonhydrogen atoms or together are a conjugated diene having from 4 to 30 nonhydrogen atoms forming a π-complex with M, whereupon M is in the +2 formal oxidation state, and R*, E and x are as previously defined.

The foregoing metal complexes are especially suited for the preparation of polymers having stereoregular molecular structure. In such capacity it is preferred that the complex possesses $C_s$ symmetry or possesses a chiral, stereorigid structure. Examples of the first type are compounds possessing different delocalized π-bonded systems, such as one cyclopentadienyl group and one fluorenyl group. Similar systems based on Ti(IV) or Zr(IV) were disclosed for preparation of syndiotactic olefin polymers in Ewen, et al., *J. Am. Chem. Soc.* 110, 6255–6256 (1980). Examples of chiral structures include rac bis-indenyl complexes. Similar systems based on Ti(IV) or Zr(IV) were disclosed for preparation of isotactic olefin polymers in Wild et al., *J. Organomet. Chem.*, 232, 233–47, (1982).

Exemplary bridged ligands containing two π-bonded groups are: (dimethylsilyl-bis(cyclopentadienyl)), (methylphenylsilyl-bis(methylcyclopentadienyl)), (diphenylsilyl-bis(ethylcyclopentadienyl)), (dimethylsilyl-bis(t-butylcyclopentadienyl)), (dimethylsilyl-bis(tetramethylcyclopentadienyl)), (dimethylsilyl-bis(indenyl)), (dimethylsilyl-bis(tetrahydroindenyl)), (dimethylsilyl-bis(fluorenyl)), (dimethylsilyl-bis(tetrahydrofluorenyl)), (dimethylsilyl-bis(2-methyl-4-phenylindenyl)), (dimethylsilyl-bis(2-methylindenyl)), (dimethylsilyl-cyclopentadienyl-fluorenyl), (dimethylsilyl-cyclopentadienyl-octahydrofluorenyl), (dimethylsilyl-cyclopentadienyl-tetrahydrofluorenyl), (1,1,2,2-tetramethyl-1,2-disilyl-bis-cyclopentadienyl), 1,2-bis(cyclopentadienyl)ethane, and (isopropylidene-cyclopentadienyl-fluorenyl).

Preferred X" groups are selected from hydride, hydrocarbyl, hydrocarbyloxy, halo, amido, siloxy, phosphido, silyl, germyl, halohydrocarbyl, halosilyl, silylhydrocarbyl and aminohydrocarbyl groups, or two X" groups together form a divalent derivative of a conjugated diene or else together they form a neutral, π-bonded, conjugated diene. Most preferred X" groups are $C_{1-20}$ hydrocarbyl groups.

A further class of metal complexes utilized in the present invention corresponds to the preceding formula $L_lMX'_mX'_nX''_p$, or a dimer thereof, wherein X is a divalent substituent of up to 50 nonhydrogen atoms that together with L forms a metallocycle with M, or wherein one X' is bound to both L and M.

Preferred divalent X substituents include groups containing up to 30 nonhydrogen atoms comprising at least one atom that is oxygen, sulfur, boron or a member of Group 14 of the Periodic Table of the Elements directly attached to the delocalized π-bonded group, and a different atom, selected from the group consisting of nitrogen, phosphorus, oxygen or sulfur that is covalently bonded to M.

A preferred class of such Group 4 metal coordination complexes used according to the present invention corresponds to the formula:

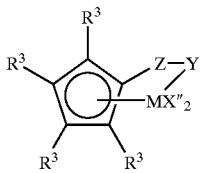

wherein:

M is titanium or zirconium in the +2 or +4 formal oxidation state;

$R^3$ in each occurrence independently is selected from the group consisting of hydrogen, hydrocarbyl, silyl, germyl, cyano, halo and combinations thereof, said $R^3$ having up to 20 nonhydrogen atoms, or adjacent $R^3$ groups together form a divalent derivative (that is, a hydrocarbadiyl, siladiyl or germadiyl group) thereby forming a fused ring system, each X" is a hydride, hydrocarbyl, hydrocarbyloxy, siloxy, amido, phosphido, halo or silyl group, said group having up to 20 nonhydrogen atoms, or two X" groups together form a neutral $C_{5-30}$ conjugated diene or a divalent derivative thereof;

Y is —O—, —S—, —NR*—, —PR*—, and

Z is SiR*$_2$, CR*$_2$, SiR*$_2$SiR*$_2$, CR*$_2$CR*$_2$, CR*=CR*, CR*$_2$SiR*$_2$, or GeR*$_2$, wherein R* is as previously defined.

A further preferred class of Group 4 metal coordination complexes used according to the present invention wherein one X' (illustrated by Z—Y') is bound to both L and M corresponds to the formula:

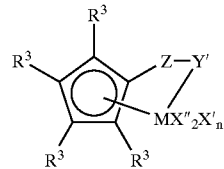

wherein:

M is titanium in the +3 formal oxidation state;

$R^3$ each occurrence is independently selected from the group consisting of hydrogen, hydrocarbyl, silyl, germyl, cyano, halo and combinations thereof, said $R^3$ having up to 20 nonhydrogen atoms, or adjacent $R^3$ groups together form a divalent derivative (that is a hydrocarbadiyl, siladiyl or germadiyl group) thereby forming a fused ring system;

each X" is a hydrocarbyl, hydrocarbyloxy, hydride, siloxy, amido, phosphido, halo or silyl group, said group having up to 20 nonhydrogen atoms;

Y' is —OR*, —SR*, NR*$_2$, —PR*$_2$;

Z is SiR*$_2$,CR*$_2$, SiR*$_2$SiR*$_2$, CR*$_2$CR*$_2$, CR*=CR*, CR*$_2$SiR*$_2$, or GeR*$_2$, wherein R* is as previously defined; and n is a number from 0 to 3.

An especially preferred group of transition metal complexes for use in the catalysts of this invention are those disclosed in U.S. Pat. No. 5,470,993, incorporated herein by reference, which correspond to the formula:

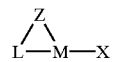

wherein:

M is titanium or zirconium in the +2 formal oxidation state;

L is a group containing a cyclic, delocalized anionic, π-system through which the group is bound to M, and which group is also bound to Z;

Z is a moiety bound to M via σ-bond, comprising boron, and the members of Group 14 of the Periodic Table of the Elements, and also comprising an element selected from the groups consisting of an element selected from the groups consisting of nitrogen, phosphorus, sulfur and oxygen, said moiety having up to 60 nonhydrogen atoms; and X is a neutral, conjugated or nonconjugated diene, optionally substituted with one or more groups selected from hydrocarbyl or trimethylsilyl groups, said X having up to 40 carbon atoms and forming a π-complex with M.

Illustrative Group 4 metal complexes that may be employed in the practice of the present invention include:

cyclopentadienyltitaniumtrimethyl,
cyclopentadienyltitaniumtriethyl,
cyclopentadienyltitaniumtriisopropyl,
cyclopentadienyltitaniumtriphenyl,
methylcyclopentadienyltitaniumtribenzyl,
pentamethylcyclopentadienyltitanium-2,4-dimethylpentadienyl,
cyclopentadienyltitanium-2,4-dimethylpentadienylotriethylphosphine,
cyclopentadienyltitanium-2,4-dimethylpentadienyletrimethylphosphine,
cyclopentadienyltitaniumdimethylmethoxide,
cyclopentadienyltitaniumdimethylchloride,
pentamethylcyclopentadienyltitaniumtrimethyl,
indenyltitaniumtrimethyl,
2-methylindenyltitaniumtriethyl,
2-phenylindenyltitaniumtripropyl,
3-methylindenyltitaniumtriphenyl,
tetrahydroindenyltitaniumtribenzyl,
tetramethylcyclopentadienyltitaniumtriisopropyl,
pentamethylcyclopentadienyltitaniumtribenzyl,
pentamthylcyclopentadienyltitanumdimethyhnethoxide,
pentamethylcyclopentadienyltitaniumdimethylchloride,
bis($\eta^5$-2,4-dimethylpentadienyl)titanium,
bis($\eta^5$-3-methylpentadienyl)titaniumotrimethylphosphine,
bis($\eta^5$-1,5-bis(trimethylsilyl)pentadienyl) titaniumetriethylphosphine,
octahydrofluorenyltitaniumtrimethyl,
tetrahydroindenyltitaniumtrimethyl,
tetrahydrofluorenyltitaniumtrimethyl,
(tert-butylamido)(1,1-dimethyl-2,3,4,9,10η-1,4,5,6,7,8-hexahydronaphthalenyl)dimethylsilanetitaniumdimethyl,
(tert-butylamido)(1,1,2,3-tetramethyl-2,3,4,9,10-η-1,4,5,6,7,8-hexahydronaphthalenyl) dimethylsilanetitaniumdimethyl,
(cyclohexylamido)(tetramethyl-$\eta^5$-cyclopentadienyl) dimethylsilanetitanium dibenzyl,
(tert-butylamido)(tetramethyl-$\eta^5$-cyclopentadienyl) dimethylsilanetitanium dimethyl,
(teit-butylamido)(tetramethyl-$\eta^5$-cyclopentadienyl)1,2-ethanediyltitanium dimethyl,
(tert-butylamido)(tetramethyl-$\eta^5$-indenyl) dimethylsilanetitanium dimethyl,
(tert-butylamido)(tetramethyl-$\eta^5$-cyclopentadienyl) dimethylsilane titanium (III) 2-(dimethylamino)benzyl,
(tert-butylamido)(tetramethyl-$\eta^5$-cyclopentadienyl) dimethylsilanetitanium (III) allyl,
(isopropylamido)(tetramethyl-$\eta^5$-cyclopentadienyl) dimethylsilanetitaniwn (III) 2,4-dimethylpentadienyl,
(tert-butylamido)(tetramethyl-$\eta^5$-cyclopentadienyl) dimethylsilanetitanium (II) 1,4-diphenyl-1,3-butadiene,
(tert-butylamido)(tetramethyl-$\eta^5$-cyclopentadienyl) dimethylsilanetitanium (II) 1,3-pentadiene,
(tert-butylamido)(2-methylindenyl)dimethylsitanetitanium (II) 1,4-diphenyl-1,3-butadiene,
(cyclodocedylamindo)(2-methylindenyl) dimethylsilanetitanium (II) 2,4-hexadiene,
(tert-butylamido)(2-methylindenyl)dimethylsilanetitanium (IV) 2,3-dimethyl-1,3-butadiene,
(anilido)(2-methylindenyl)dimethylsilanetitanium (IV) isoprene,
(ethylamido)(2-methylindenyl)dimethylsilanetitanium (III) 2-(dimethylamino)benzyl,
(tert-butylamido)(2,3-dimethylindenyl) dimethylsilanetitanium (IV) 2,3-dimethyl-1,3-butadiene,
(cyclohexylamido)(2,3-dimethylindenyl) dimethylsilanetitanium (III) 2-(dimethylamino)benzyl,
(tert-butylamido)(2,3-dimethylindenyl) dimethylsilanetitanium (IV) dimethyl(methylamido)(2,3-dimethylindenyl)dimethylsilanetitanium (IV) dibenzyl (anilido)(2,3-dimethylindenyl)dimethylsilanetitanium (IV) 1,3-butadiene,
(tert-butylamido)(2,3-dimethylindenyl) dimethylsilanetitanium (II) 1,3-pentadiene,
(tert-butylamido)(2,3-dimethylindenyl) dimethylsilanetitanium (II) 1,4-diphenyl-1,3-butadiene,
(anilido)(2-methylindenyl)dimethylsilanetitanium (II)1,3-pentadiene,
(tert-butylamido)(2-methylindenyl)dimethylsilanetitanium (IV) dimethyl,
(tert-butylamido)(2-methylindenyl)dimethylsilanetitanium (III) 2-(dimethylamino)benzyl,
(tert-butylamido)(2-methyl-4-phenylindenyl) dimethylsilanetitanium (II) 1,4diphenyl-1,3-butadiene,
(tert-butylamido)(2-methyl-4-phenylindenyl) dimethylsilanetitanium (II) 1,3-pentadiene,
(cyclohexylamido)(2-methyl4-phenylindenyl) dimethylsilanetitanium (II) 2,4-hexadiene,
(tert-butylamido)(tetramethyl-$\eta^5$-cyclopentadienyldimethylsilanetitanium (IV) 1,3-butadiene,
(tert-butylamido)(tetramethyl-$\eta^5$-cyclopentadienyl) dimethylsilanetitanium (III) 2-(dimethylamino)benzyl
(tert-butylamido)(tetramethyl-$\eta^5$-cyclopentadienyl) dimethylsilanetitanium (IV) isoprene,
(tert-pentylamido)(tetramethyl-$\eta^5$-cyclopentadienyl) dimethylsilanetitanium (II) 1,4-dibenzyl-1,3-butadiene,
(tert-butylamido)(tetramethyl-$\eta^5$-cyclopentadienyl (dimethylsilanetitanium (II) 2,4-hexadiene,
(tert-butylamido)(tetramethyl-$\eta^5$-cyclopentadienyl) dimethylsilanetitanium (II) 3-methyl-1,3-pentadiene,
(tert-butylamido)(2,4-dimethylpentadienyl) dimethylsilanetitaniumdimethyl,
(tert-butylamido)(6,6-dimethylcyclohexadienyl) dimethylsilanetitaniumdimethyl,
(tert-octylamido)(1,1-dimethyl-2,3,4,9,10-η-1,4,5,6,7,8-hexahydronaphthalen-4-yl) dimethylsilanetitaniumdimethyl,
(anilido)(1,1,2,3-tetramethyl-2,3,4,9,10-η-1,4,5,6,7,8-hexahydronaphthalen-4-yl) dimethylsilanetitaniumdimethyl
(tert-butylamido)(tetramethyl-$\eta^5$-cyclopentadienyl) methylphenyl-silanetitanium (IV) dimethyl,
(tert-butylamido)(tetramethyl-$\eta^5$-cyclopentadienyl) methylphenyl-silanetitanium (II) 1,4-diphenyl-1,3-butadiene,
1-(tert-butylamido)-2-(tetramethyl-$\eta^5$-cyclopentadienyl) ethanediyl-titanium (IV) dimethyl,
1-(tert-butylamido)-2-(tetramethyl-$\eta^5$-cyclopentadienyl) ethanediyl-titanium (II) 1,4-diphenyl-1,3-butadiene,
1-(dimethylamino)-2-(tetramethyl-$\eta^5$-cyclopentadienyl) ethanediyl-titanium (II) dimethyl,
1-(dimethylamino)-2-(tetramethyl-$\eta^5$-cyclopentadienyl) ethanediyl-titanium (III) diallyl,
1-(dimethylamino)-2-(tetramethyl-$\eta^5$-cyclopentadienyl) ethanediyl-titanium (III) dibenzyl,
1-(diisobutylamino)-2-(tetramethyl-$\eta^5$-cyclopentadienyl) ethanediyl-titanium (III) dimethyl,
1-(diisopropylamino)-2-(tetramethyl-$\eta^5$-cyclopentadienyl) ethanediyl-titanium (III) dimethyl, 1-(methylphenylamino)-2-(tetramethyl-$\eta^5$-cyclopentadienyl)ethanediyl-titanium (III) dimethyl,
(dimethylamino)(tetramethyl-$\eta^5$-cyclopentadienyl) dimethylsilyltitanium (III) dimethyl,
(diethylamino)(tetramethyl-$\eta^5$-cyclopentadienyl) dimethylsilyltitanium (III) diallyl,
(dimethylamino)(tetramethyl-$\eta^5$-cyclopentadienyl) dimethylsilyltitanium (III) dibenzyl,
(diisobutylamino)(tetramethyl-$\eta^5$-cyclopentadienyl) dimethylsilyl-titaniun (III) dimethyl,
(diisopropylamino)(tetramethyl-$\eta^5$-cyclopentadienyl) dimethylsilyl-titanium (III) methylphenyl,
(methylphenylamino)(tetramethyl-$^5$-cyclopentadienyl) dimethylsilyl-titanium (III) dimethyl,
(1-methylethoxy)(tetramethyl-$\eta^5$-cyclopcntadienyl) dimethylsilane-titanium (III) dimethyl,
1-(dimethylamino)-2-(tetramethyl-$\eta^5$-cyclopentadienyl)-1,1,2,2-tetranethyldisilyltitanium (III) dimethyl,
1-(dimethylamino)-2-(tetramethyl-$\eta^5$-cyclopentadienyl)-1,1,2,2-tetramethyldisilyltitanium (III) diallyl,
1-(diethylamino)-2-(tetramethyl-$\eta^5$-cyclopentadienyl)-1,1,2,2-tetramethyldisilyltitanium (III) dibenzyl,
1-(diisobutylamino)-2-(tetramethyl-$\eta^5$-cyclopentadienyl)-1,1,2,2-tetramethyldisilyltitanium (III) dimethyl,
1-(diisopropylamino)-2-(tetramethyl-$\eta^5$-cyclopentadienyl)-1,1,2,2-tetramethyldisilyltitanium (III) dimethyl,
1-(methylphenylamino)-2-(tetramethyl-$\eta^5$-cyclopentadienyl)-1,1,2,2-tetramethyldisilyltitanium (III) dimethyl,
1-(diethylamiino)-2-(2,3-dimethyl-$\eta^5$-indenyl) ethanediyltitanium (III) dimethyl,
1-(dimethylamino)-2-(2-methyl-$\eta^5$-indenyl) ethanediyltitanium (II) diallyl,
1-(dimethylamino)-2-(2,3,4,6-tetramethyl-$\eta^5$-indenyl) ethanediyltitanium (III) dibenzyl,
1-(diisobutylamino)-2-$\eta^5$-indenyl)ethanediyltitanium (III) dimethyl,
1-(diisopropylamino)-2-$\eta^5$-cyclopentadienyl) ethanediyltitanium (II) dimethyl,
1-(methylphenylamino)-2-$\eta^5$-tetrahydroindenyl) ethanediyltitanium (III) dimethyl,
(dimethylamino)($\eta^5$-tetrahydrofluorenyl) dimethylsilyltitanium (III) dimethyl,
(diethylamino)($\eta^5$-octahydrofluorenyl) dimethylsilyltitanium (III) diallyl,
(dimethylamino)(2,3,4,6-tetramethyl-$\eta^5$-indenyl) dimethylsilyltitanium (III) dibenzyl,
(diisobutylamino)(2,3,4,6-tetramethyl-$\eta^5$-indenyl) diimethylsilyl-titanium (III) dimethyl,
(diisopropylamino)(2,3,4,6-tetramethyl-$\eta^5$-indenyl) dimethylsilyl-titanium (III) dimethyl,
(methylphenylamino)(2,3,4,6-tetramethyl-$\eta^5$-indenyl) dimethylsilyi-titanium (III) dimethyl,
(1-methylethoxy)(2,3,4,6-tetramethyl-$\eta^5$-indenyl) dimethylsilanetitanium (III) dimethyl,
1-(dimethylamino)-2-(2,3,4,6-tetramethyl-$\eta^5$-indenyl)-1,2,2-tetramethyldisilyltitanium (III) dimethyl,
1-(dimethylamino)-2-(2,3,4,6-tetramethyl-$\eta^5$-indenyl)-1,1,2,2-tetramethyldisilyltitanium (III) diallyl,
1-(diethylamino)-2-(2,3,4,6-tetramethyl-$\eta^5$-indenyl)-1,1,2,2-tetramethyldisilyltitanium (III) dibenzyl,
1-(diisobutylamino)-2-(2,3,4,6-tetramethyl-$\eta^5$-indenyl)-1,1,2,2-tetramethyldisilyltitanium (III) dimethyl,
1-(diisopropylamino)-2-(2,3,4,6-tetramethyl-$\eta^5$-indenyl)-1,1,2,2-tetramethyldisilyltitanium (III) dimethyl, and
1-(methylphenylamino)-2-(2,3,4,6-tetramethyl-$\eta^5$-indenyl)-1,1,2,2-tetramethyldisilyltitanium (III) dimethyl.

Complexes containing two L groups including bridged complexes suitable for use in the present invention include:

bis(cyclopentadienyl)zirconiumdimethyl,
bis(butylcyclopentadienyl)zirconium dibenzyl,
bis(cyclopentadienyl)zirconium methyl benzyl, bis(cyclopentadienyl)zirconium methyl phenyl, bis(methylcyclopentadienyl)zirconiumdiphenyl,
bis(cyclopentadienyl)titanium-allyl,
bis(butylcyclopentadienyl)zirconiumiethylmethoxide,
bis(cyclopentadienyl)zirconiunmethylchloride,
bis(pentamethylcyclopentadienyl)zirconiumdimethyl,
bis(pentamethylcyclopentadienyl)titaniumdimethyl,
bis(indenyl)zirconiumdimethyl,
indenylfluorenylzirconiumdimethyl,
bis(2-phenylindenyl)zirconiummethyl(2-(dimethylamino)benzyl),
bis(indenyl)zirconium methyltrimethylsilyl,
bis(tetrahydroindenyl)zirconium methyltrimethylsilyl,
bis(trimethylsilylcyclopentadienyl)zirconiummethylbenzyl,
bis(pentamethylcyclopentadienyl)zirconiumdibenzyl,
bis(pentamethylcyclopentadienyl) zirconiummethylmethoxide,
bis(tetramethylcyclopentadienyl)zirconiummethylchloride,
bis(methylethylcyclopentadienyl)zirconiumdimethyl,
bis(ethylbutylcyclopentadienyl)zirconium dibenyl,
bis(t-butylcyclopentadienyl)zirconiumdimethyl,
bis(ethyltetramethylcyclopentadienyl)zirconiumdimethyl,
bis(methylpropylcyclopentadienyl)zirconium dibenzyl,
bis(bis(trimethylsily)clopentadienyl)zirconium dibenzyl,
dimethethylsilyl-bis(cyclopentadienyl)zirconiumdimethyl,
dimethylsilyl-bis(tetramethylcyclopentadienyl)titanium-(III) allyl
dimethylsilyl-bis(t-butylcyclopentadienyl) zirconiumdichloride, dimethylsilyl-bis(n-butylcyclopentadienyl)zirconiumdichloride,
methylene-bis(tetramethylcyclopentadienyl)titanium(III) 2-(dimethylamio)benzyl,
methylene-bis(n-butylcyclopentadienyl)titanium(III) 2-(dimethylaminomethyl)phenyl,
dimethylsiyly-bis(indenyl)zirconiumbenzylchloride,
dimethylsilyl-bis(2-methylindenyl)zirconiumdimethyl,
dimethylsilyl-bis(2-methyl-4-phenylindenyl) zirconiumdimethyl,
dimethylsilyl-bis(2-methylindenyl)zirconium(II) 1,4-diphenyl-1,3-butadiene,
dimethylsilyl-bis(2-methyl4-phenylindenyl)zirconium (II) 1,4-diphenyl-1,3-butadiene,
dimethylsilyl-bis(tetrahydroindenyl)zirconium(II) 1,4-diphenyl-1,3-butadiene,
dimethsilyl-bis(fluorenyl)zirconiunmuethylchloride,
dimethylsilyl-bis(tetrahydrofluorenyl)zirconium bis(trimethylsilylmethyl),
(isopropylidene)(cyclopentadienyl)(fluorenyl) zirconiumdibenzyl, and
dimethylsilyl(tetramethylcyclopentadienyl)(fluorenyl) zirconium dimethyl.

(N-(1,1-dimethylethyl)-1,1-dimethyl-1-((1,2,3,3a,7$\eta$)-3-(1-pyrrolidinyl)-1H-inden-1-yl)silanaminato(2-)-N) dimethyltitanium
(N(1,1-dimethylethyl)-1,1-dimethyl-1-((1,2,3,3a,7a-$\eta$)-3-(1-piperidinyl) 1H -1-yl)silanaminato(2-)-N) dimethyltitanium
((2-(dimethylamino)phenyl)methyl)(1,1-dimethyl-N-phenyl-1-((1,2,3,3a,7a-$\eta$)-3-(1-pyrrolidinyl)-1H-inden-1-yl)silanaminato(2-)-N)titanium (N-(1,1-dimethylethyl)-1,1-dimethyl-1-((1,2,3,3a,7a-η)-3-(1-pyrrolidinyl)-1H-inden-1-yl)silanaminato(2-)-N)((1,2,3,4-η)-2,4-hexadiene)titanium (1,1'-(η⁴-1,3-butadiene-1,4-diyl)bis(benzene))(N-(1,1-dimethylethyl)-1,1-dimethyl-1-((1,2,3,3a,7a-η)-3-(1-pyrrolidinyl)-1H-inden-1-yl)silanaminato(2-)-N)titanium ((2-(dimethylamino)phenyl)methyl)(N-(1,1-dimethylethyl)-1,1-dimethyl-1-((1,2,3,3a,7-η)-3-(1-pyrrolidinyl)-1H-inden-1-yl)silanaminato(2-)-N)titanium (N-cyclohexyl-1,1-dimethyl-1-((1,2,3,3a,7a-η)-5-phenyl-3-(1-pyrrolidinyl)-1H-inden-1-yl)silanaminato(2-)-N)dimethyltitanium (N-(1,1-dimethylethyl)-1,1-dimethyl-1-((1,2,3,3a,7-η)-3-(dimethylamino)-1H-inden-1-yl)silanaminato(2-)-N)dimethyltitanium (N-(1,1-dimethylethyl)-1,1-dimethyl-1-((1,2,3,3a,7a-η)-3-methoxy-1H-inden-1-yl)silanaminato(2-)-N)dimethyltitanium (N-(1,1-dimethylethyl)-2-((1,2,3,3a,7-η)-2-methyl-3-(1-pyrrolidinyl)-1H-inden-1-yl)-ethanaminato(2-)-N)dimethyltitanium (1,1'-(η⁴-1,3-butadiene-1,4-diyl)bis(benzene))(N-(1,1-dimethylethyl)-1,1-dimethyl-1-((1,2,3,4,5-η)-2,4,5-trimethyl-3-(1-pyrrolidinyl)-2,4-cyclopentadien-1-yl)silanaminato(2-)N)titanium Especially preferred bis-Cp complexes for use in the catalysts useful in this invention are the bridged bis-Cp complexes of EP 676,421 which correspond to the formula:

wherein
Cp¹, Cp² are independently a substituted or unsubstituted indenyl or hydrogenated indenyl group;
Y is a univalent anionic ligand, or Y₂ is a diene;
M is zirconium, titanium or hafnium; and
Z is a bridging group comprising an alkylene group having 1 to 20 carbon atoms or a dialkylsilyl or dialkylgermyl group, or alkylphosphine or alkylarine radical.

Another class of preferred metal complexes for use in the present invention correspond to the formula (I):

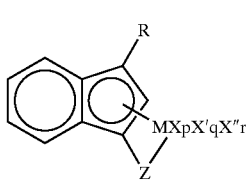

where
M is titanium, zirconium or hafnium in the +2, +3 or +4 formal oxidation state:
R is an aryl ligand or a halo-, silyl-, alkyl-, cycloalkyl-, dihydrocarbylamino-, hydrocarbyloxy-, or hydrocarbyleneamino-, substituted derivative thereof, said R' having from 6 to 40 nonhydrogen atoms;
Z is a divalent moiety, or a moiety comprising one σ-bond and a neutral two electron pair able to form a coordinate-covalent bond to M, said Z comprising boron, or a member of Group 14 of the Periodic Table of the Elements, and also comprising nitrogen, phosphorus, sulfur or oxygen;
X is a monovalent anionic ligand group having up to 60 atoms exclusive of the class of ligands that are cyclic, delocalized, π-bound ligand groups;
X' independently each occurrence is a neutral Lewis base ligating compound having up to 20 atoms;
X" is a divalent anionic ligand group having up to 60 atoms;
p is zero, 1, 2, or 3;
q is zero, 1 or 2; and
r is zero or 1.

The above complexes may exist in pure form or as a mixture with other complexes, in the form of a solvated adduct, optionally in a solvent, especially an organic liquid, as well as in the form of a dimer or chelated derivative thereof, wherein the chelating agent is an organic material.

Another class of preferred metal complexes for use in the present invention correspond to the formula:

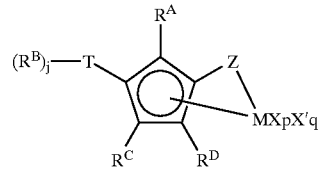

where
M is a metal from one of Groups 3 to 13 of the Periodic Table of the Elements, the lanthanides or actinides, which is in the +2, +3 or +4 formal oxidation state and which is π-bonded to one cyclopentadienyl group (Cp) which is a cyclic, delocalized, π-bound ligand group having 5 substituents: $R^A$; $(R^B)_j$-T where j is zero, 1 or 2; $R^C$; $R^D$ and Z; where $R^A$, $R^B$, $R^C$ and $R^D$ are R groups; and where
T is a heteroatom which is covalently bonded to the Cp ring, and to $R^B$ when j is 1 or 2, and when j is 0, T is F, Cl, Br, or I; when j is 1, T is O or S, or N or P and $R^B$ has a double bond to T; when j is 2, T is N or P; and where
$R^B$ independently each occurrence is hydrogen, or, is a group having from 1 to 80 nonhydrogen atoms which is hydrocarbyl, hydrocarbylsilyl, halo-substituted hydrocarbyl, hydrocarbyloxy-substituted hydrocarbyl, hydrocarbylamino-substituted hydrocarbyl, hydrocarbylsilylhydrocarbyl, hydrocarbylamino, di(hydrocarbyl)amino, hydrocarbyloxy, each $R^B$ optionally being substituted with one or more groups which independently each occurrence is hydrocarbyloxy, hydrocarbylsiloxy, hydrocarbylsilylamino, di(hydrocarbylsilyl)amino, hydrocarbylamino, di(hydrocarbyl)amino, di(hydrocarbyl)phosphino, hydrocarbylsulfido, hydrocarbyl, halo-substituted hydrocarbyl, hydrocarbyloxy-substituted hydrocarbyl, hydrocarbylamino-substituted hydrocarbyl, hydrocarbylsilyl or hydrocarbylsilylhydrocarbyl having from 1 to 20 nonhydrogen atoms, or a noninterfering group having from 1 to 20 nonhydrogen atoms; and each of $R^A$, $R^C$ and $R^D$ is hydrogen, or is a group having from 1 to 80 nonhydrogen atoms which is hydrocarbyl, halo-substituted hydrocarbyl, hydrocarbyloxy-substituted hydrocarbyl, hydrocarbylamino-substituted hydrocarbyl, hydrocarbylsilyl, hydrocarbylsilylhydrocarbyl, each $R^A$, $R^C$ or $R^D$ optionally being substituted with one or more groups which independently each occurrence is hydrocarbyloxy, hydrocarbylsiloxy, hydrocarbylsilylamino, di(hydrocarbylsilyl)amino, hydrocarbylamino, di(hydrocarbyl)amino, di(hydrocarbyl)phosphino, hydrocarbylsulfido, hydrocarbyl, halo-substituted hydrocarbyl, hydrocarbyloxy-substituted hydrocarbyl, hydrocarbylamino-substituted hydrocarbyl, hydrocarbylsilyl or hydrocarbylsilylhydrocarbyl having from 1 to 20 nonhydrogen atoms, or a noninterfering group having from 1 to 20 nonhydrogen atoms; or, optionally, two or more of $R^A$, $R^B$, $R^C$ and $R^D$ are covalently linked with each other to form one or more fused rings or ring systems having from 1 to 80 nonhydrogen atoms for each R group, the one or more fused rings or ring systems being unsubstituted or substituted with one or more groups which independently each occurrence are hydrocarbyloxy, hydrocarbylsiloxy, hydrocarbylsilylamino, di(hydrocarbylsilyl)amino, hydrocarbylamino, di(hydrocarbyl)amino, di(hydrocarbyl)phosphino, hydrocarbylsulfido, hydrocarby, halo-substituted hydrocarbyl, hydrocarbyloxy-substituted hydrocarbyl, hydrocarbylamino-substituted hydrocarbyl, hydrocarbylsilyl or hydrocarbylsilylhydrocarbyl having from 1 to 20 nonhydrogen atoms, or a noninterfering group having from 1 to 20 nonhydrogen atoms, Z is a divalent moiety bound to both Cp and M via σ-bonds, where Z comprises boron, or a member of Group 14 of the Periodic Table of the Elements, and also comprises nitrogen, phosphorus, sulfur or oxygen;

X is an anionic or dianionic ligand group having up to 60 atoms exclusive of the class of ligands that are cyclic, delocalized, π-bound ligand groups;

X' independently each occurrence is a neutral Lewis base ligating compound having up to 20 atoms;

p is zero, 1 or 2, and is two less than the formal oxidation state of M, when X is an anionic ligand; when X is a dianionic ligand group, p is 1; and q is zero, 1 or 2.

Another class of preferred metal complexes for use in the present invention corresponding to the formula:

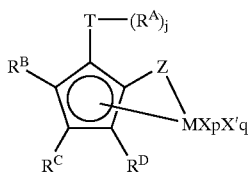

where

M is a metal from one of Groups 3 to 13 of the Periodic Table of the Elements, the lanthanides or actinides, which is in the +2, +3 or +4 formal oxidation state and which is π-bonded to one cyclopentadienyl group (Cp) which is a cyclic, delocalized, π-bound ligand group having 5 substituents: $(R^A)_j$-T where j is zero, 1 or 2; $R^B$; $R^C$; $R^D$ and Z; where $R^A$, $R^B$, $R^C$ and $R^D$ are R groups; and where T is a heteroatom which is covalently bonded to the Cp ring, and to $R^A$ when j is 1 or 2, and when j is 0, T is F, Cl, Br, or I; when j is 1, T is G or S, or N or P and $R^A$ has a double bond to T; when j is 2, T is N or P; and where $R^A$ independently each occurrence is hydrogen, or, is a group having from 1 to 80 nonhydrogen atoms which is hydrocarbyl, hydrocarbylsilyl, halo-substituted hydrocarbyl, hydrocarbyloxy-substituted hydrocarbyl, hydrocarbylamino-substituted hydrocarbyl, hydrocarbylsilylhydrocarbyl, hydrocarbylamino, di(hydrocarbyl)amino, hydrocarbyloxy, each $R^A$ optionally being substituted with one or more groups which independently each occurrence is hydrocarbyloxy, hydrocarbylsiloxy, hydrocarbylsilylamino, di(hydrocarbylsilyl)amino, hydrocarbylamino, di(hydrocarbyl)amino, di(hydrocarbyl)phosphino, hydrocarbylsulfido, hydrocarbyl, halo-substituted hydrocarbyl, hydrocarbyloxy-substituted hydrocarbyl, hydrocarbylamino-substituted hydrocarbyl, hydrocarbylsilyl or hydrocarbylsilylhydrocarbyl having from 1 to 20 nonhydrogen atoms, or a noninterfering group having from 1 to 20 nonhydrogen atoms; and each of $R^B$, $R^C$ and $R^D$ is hydrogen, or is a group having from 1 to 80 nonhydrogen atoms which is hydrocarbyl, halo-substituted hydrocarbyl, hydrocarbyloxy-substituted hydrocarbyl, hydrocarbylamino-substituted hydrocarbyl, hydrocarbylsilyl, hydrocarbylsilylhydrocarbyl, each $R^B$, $R^C$ or $R^D$ optionally being substituted with one or more groups which independently each occurrence is hydrocarbyloxy, hydrocarbylsiloxy, hydrocarbylsilylamino, di(hydrocarbylsilyl)amino, hydrocarbylamino, di(hydrocarbyl)amino, di(hydrocarbyl)phosphino, hydrocarbylsulfido, hydrocarbyl, halo-substituted hydrocarbyl, hydrocarbyloxy-substituted hydrocarbyl, hydrocarbylamino-substituted hydrocarbyl, hydrocarbylsilyl or hydrocarbylsilylhydrocarbyl having from 1 to 20 nonhydrogen atoms, or a noninterfering group having from 1 to 20 nonhydrogen atoms; or, optionally, two or more of $R^A$, $R^B$, $R^C$ and $R^D$ are covalently linked with each other to form one or more fused rings or ring systems having from 1 to 80 nonhydrogen atoms for each R group, the one or more fused rings or ring systems being unsubstituted or substituted with one or more groups which independently each occurrence are hydrocarbyloxy, hydrocarbylsiloxy, hydrocarbylsilylamino, di(hydrocarbylsilyl)amino, hydrocarbylamino, di(hydrocarbyl)amino, di(hydrocarbyl)phosphino, hydrocarbylsulfido, hydrocarbyl, halo-substituted hydrocarbyl, hydrocarbyloxy-substituted hydrocarbyl, hydrocarbylamino-substituted hydrocarbyl, hydrocarbylsilyl or hydrocarbylsilylhydrocarbyl having from 1 to 20 nonhydrogen atoms, or a noninterfering group having from 1 to 20 nonhydrogen atoms;

Z is a divalent moiety bound to both Cp and M via σ-bonds, where Z comprises boron, or a member of Group 14 of the Periodic Table of the Elements, and also comprises nitrogen, phosphorus, sulfur or oxygen;

X is an anionic or dianionic ligand group having up to 60 atoms exclusive of the class of ligands that are cyclic, delocalized, π-bound ligand groups;

X' independently each occurrence is a neutral Lewis base ligating compound having up to 20 atoms;

p is zero, 1 or 2, and is two less than the formal oxidation state of M, when X is an anionic ligand, when X is a dianionic ligand group, p is 1; and q is zero, 1 or 2.

Constrained geometry metal complexes and methods for their preparation are disclosed in U.S. application Ser. No. 545,403, filed Jul. 3, 1990 (EP-A416,815), U.S. application Ser. No. 547,718, filed Jul. 3, 1990 (EP-A-468,65I), U.S. application Ser. No. 702,475, filed May 20, 1991 (EP-A-514,828), U.S. application Ser. No. 876,268, filed May 1,1992 (EP-A-520,732); and U.S. application Ser. No. 8,003, filed Jan. 21, 1993 (WO 93/19104), as well as U.S. Pat. Nos. 5,055,438; 5,057,475; 5,096,867; 5,064,802; 5,132,380; and WO 95/00526. The teachings of all of the foregoing patents or the corresponding U.S. patent applications are hereby incorporated by reference.

The metallocene complex component may be produced with a single metallocene complex, or, in alternative embodiment, it may be produced with two or more metallocene complexes, or it may be produced with at least one metallocene complex and at least one nonmetallocene complex.

Other catalysts, especially catalysts containing other Group 4 metals, will, of course, be apparent to those skilled in the art.

The supported olefin polymerization catalyst system comprises an activator component which is used to activate the metallocene complex component of the catalyst system. In a preferred embodiment of this invention, the activator component comprises a cocatalyst, especially an activating cocatalyst.

Alternatively, in another embodiment, the complexes are rendered catalytically active by the use of an activating technique or method.

Suitable activating cocatalysts for use herein include polymeric or oligomeric alumoxanes, especially methylalumoxane, triisobutyl aluminum-modified methylalumoxane, or diisobutylalumoxane; strong Lewis acids, such as $C_{1-30}$ hydrocarbyl substituted Group 13 compounds, especially tri(hydrocarbyl)aluminum- or tri(hydrocarbyl)boron-compounds and halogenated derivatives thereof, having from 1 to 1 0 carbons in each hydrocarbyl or halogenated hydrocarbyl group, especially tris (pentafluorophenyl)borane; and nonpolymeric, inert, compatible, noncoordinating, ion forming compounds (including the use of such compounds under oxidizing conditions). A suitable activating technique is bulk electrolysis (explained in more detail hereinafter). Combinations of the foregoing activating cocatalysts and techniques may also be employed if desired. The foregoing activating cocatalysts and activating techniques have been previously taught with respect to different metal complexes in the following references: EP-A-277,003; U.S. Pat. Nos. 5,153,157; 5,064,802; EP-A-468,651 (equivalent to U.S. Ser. No. 07/547,718); EP-A-520,732 (equivalent to U.S. Ser. No. 07/876,268); and U.S. Pat, No. 5,350,723; teachings of which are hereby incorporated by reference.

Suitable nonpolymeric, inert, compatible, noncoordinating, ion forming compounds useful as cocatalysts in one embodiment of the present invention comprise a cation which is a Bronsted acid capable of donating a proton, and a compatible, noncoordinating, anion, $A^-$. Preferred anions are those containing a single coordination complex comprising a charge-bearing metal or metalloid core which anion is capable of balancing the charge of the active catalyst species (the metal cation) which is formed when the two components are combined. Also, said anion can be displaced by olefinic, diolefinic and acetylenically unsaturated compounds or other neutral Lewis bases such as ethers or nitriles. Suitable metals include, but are not limited to, aluminum, gold and platinum. Suitable metalloids include, but are not limited to, boron, phosphorus, and silicon. Compounds containing anions which comprise coordination complexes containing a single metal or metalloid atom are well known and many, particularly such compounds containing a single boron atom in the anion portion, are available commercially.

Preferably such cocatalysts may be represented by the following general formula:

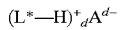

$$(L^*—H)^+_d A^{d-}$$

wherein:

L* is a neutral Lewis base;
$(L^*—H)^+$ is a Bronsted acid;
$A^{d-}$ is a noncoordinating, compatible anion having a charge of d–, and d is an integer from 1 to 3.
More preferably d is one, that is, $A^{d-}$ is A—.
Highly preferably, $A^-$ corresponds to the formula: $[BQ_4]^-$
wherein:
B is boron in the +3 formal oxidation state; and
Q independently each occurrence is selected from hydride, dialkylarido, halide, alkoxide, aryloxide, hydrocarbyl, halocarbyl, and halo-substituted-hydrocarbyl radicals, said Q having up to 20 carbons with the proviso that in not more than one occurrence is Q halide.

In a more highly preferred embodiment, Q is a fluorinated $C_{1-20}$ hydrocarbyl group, most preferably, a fluorinated aryl group, especially, pentafluorophenyl.

Illustrative, but not limiting, examples of ion forming compounds comprising proton donatable cations which may be used as activating cocatalysts in the preparation of the catalysts of this invention are tri-substituted ammonium salts such as:

trimethylammonium tetraphenylborate,
methyldioctadecylammonium tetraphenylborate,
triethylammonium tetraphenylborate,
tripropylammonium tetraphenylborate,
tri(n-butyl)ammonium tetraphenylborate,
metbyltetradecyloctadecylammonium tetraphenylborate,
N,N-dimethylanilinium tetraphenylborate,
N,N-diethylanilinium tetraphenylborate,
N,N-dimethyl(2,4,6-trimethylanilinium) tetraphenylborate,
trimethylammonium tetrakis(penta-fluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate,
N,N-dimethyl(2,4,6-trimethylanilinium) tetrakis (pentafluorophenyl)borate,
trimethylammoniun tetrakis(2,3,4,6-tetrafluorophenyl) borate,
triethylammonium tetrakis(2,3,4,6-tetrafluorophenyl)borate,
tripropylammonium tetrakis(2,3,4,6-tetrafluorophenyl) borate,
tri(n-butyl)ammonium tetrakis(2,3,4,6-tetrafluorophenyl) borate,
dimethyl(t-butyl)ammonium tetrakis(2,3,4,6-tetrafluorophenyl)borate,
N,N-dimethylanilinium tetrakis(2,3,4,6-tetrafluorophenyl) borate,
N,N-diethylanilinium tetrakis(2,3,4,6-tetrafluorophenyl) borate, and
N,N-dimethyl-(2,4,6-trimethylanilinium) tetrakis-(2,3,4,6-tetrafluoro-phenyl)borate.

Dialkyl ammonium salts such as:

di-(i-propyl)ammonium tetrakis(pentafluorophenyl)borate, and
dicyclohexylammonium tetrakis(pentafluorophenyl)borate.

Tri-substituted phosphonium salts such as:

triphenylphosphonium tetrakis(pentafluorophenyl)borate,
tri(o-tolyl)phosphonium tetrakis(pentafluorophenyl)borate, and
tri(2,6dimethylphenyl)phosphonium tetrakis(pentafluorophenyl)borate.

Preferred are tetrakis(pentafluorophenyl)borate salts of long chain alkyl mono- and disubstituted ammonium complexes, especially $C_{14}$–$C_{20}$ alkyl ammonium complexes, especially methyldi(octadecyl)ammonium tetrakis(pentafluorophenyl)borate and methyldi(tetradecyl)ammonium tetrakis(pentafluorophenyl)borate.

An especially preferred group of activating cocatalysts is tris(pentafluorophenyl)borane, N—$R_3$,N—$R_4$ anilinium tetrakis(pentafluorophenyl)borate where $R_3$ and $R_4$ independently each occurrence are substituted or unsubstituted saturated hydrocarbyl groups having from 1 to 8 carbon atoms, $(R_1R_2NHCH_3)^+(C_6H_4OH)B(C_6F_5)_3^-$, or $(R_1R_2NHCH_3)^+B(C_6F_5)_4^-$, where $R_1$ and $R_2$ independently each occurrence are substituted or unsubstituted saturated hydrocarbyl groups having from 12 to 30 carbon atoms.

Another suitable ion forming, activating cocatalyst comprises a salt of a cationic oxidizing agent and a noncoordinating, compatible anion represented by the formula:

$$(Ox^{e+})_d(A^{d-})_e$$

wherein:

$Ox^{e+}$ is a cationic oxidizing agent having charge $e^+$;

e is an integer from 1 to 3; and $A^{d-}$, and d are as previously defined.

Examples of cationic oxidizing agents include: ferrocenium, hydrocarbyl-substituted ferrocenium, $Ag^+$, or $Pb^{+2}$. Preferred embodiments of $A^{d-}$ are those anions previously defined with respect to the Bronsted acid containing activating cocatalysts, especially tetrakis(pentafluorophenyl)borate.

Another suitable ion forming, activating cocatalyst comprises a compound which is a salt of a carbenium ion or silylium ion and a noncoordinating, compatible anion represented by the formula:

$$©^+A^-$$

wherein:

$©^+$ is a $C_{1-20}$ carbenium ion or silylium ion; and $A^-$ is as previously defined.

A preferred carbenium ion is the trityl cation, that is triphenylcarbenium. A preferred silylium ion is triphenylsilylium.

Ionic compounds (a) suitable for use in the present invention and their methods of preparation are described in U.S. patent application Ser. No. 08/610,647, filed Mar. 4, 1996 (corresponding to WO-96/28480) which is incorporated herein by reference. The term used in the anion a.2) of the ionic compound "at least one substituent comprising an active hydrogen moiety" means in the present application a substituent comprising a hydrogen atom bonded to an oxygen, sulphur, nitrogen or phosphorous atom.

In the anion a.2), the at least one substituent comprising an active hydrogen moiety preferably corresponds to the formula $$G_q(T—H)_r \quad (I)$$

wherein G is a polyvalent hydrocarbon radical, the group (T—H) is a radical wherein T comprises O, S, NR, or PR, the O, S, N, or P atom of which is bonded to hydrogen atom H, wherein R is a hydrocarbyl radical, a trihydrocarbyl silyl radical, a trihydrocarbyl germyl radical, or hydrogen, H is hydrogen, q is 0 or 1, and preferably 1, and r is an integer from 1 to 3, preferably 1. Polyvalent hydrocarbon radical G has r+1 valencies, one valency being associated with a metal or metalloid of the Groups 5–15 of the Periodic Table of the Elements in the anion, the other r valencies of G being attached to r groups (T—H). Preferred examples of G include di- or trivalent hydrocarbon radicals such as: alkylene, arylene, aralkylene, or alkarylene radicals containing from 1 to 20 carbon atoms, more preferably from 2 to 12 carbon atoms. Suitable examples of divalent hydrocarbon radicals G include phenylene, biphenylene, naphthylene, methylene, ethylene, 1,3-propylene, 1,4-butylene, phenylrhethylene (—$C_6H_4$—$CH_2$—). The polyvalent hydrocarbyl portion G may be further substituted with radicals that do not negatively impact the effect to be achieved by the present invention.

Preferred examples of such noninterfering substituents are alkyl, aryl, alkyl- or aryl-substituted silyl and germyl radicals, and fluoro substituents.

The group (T—H) in the previous formula may be an —OH, —SH, —NRH, or —PRH group, wherein R preferably is a $C_{1-18}$, preferably a $C_{1-12}$, hydrocarbyl radical or hydrogen, and H is hydrogen. Preferred R groups are alkyls, cycloalkyls, aryls, arylalkyls, or alkylaryls of 1 to 18 carbon atoms, more preferably those of 1 to 12 carbon atoms. Alternatively, the group (T—H) comprises an —OH, —SH, —NRH, or —PRH group which are part of a larger functional moiety such as, for example, C(O)—OH, C(S)—OH, C(S)—SH, C(O)—SH, C(O)—NRH, C(S)—NRH, and C(O)—PRH, and C(S)—PRH. Most preferably, the group (T—H) is a hydroxy group, —OH, or an amino group, —NRH.

Very preferred substituents $G_q(TH)$ in anion a.2) include hydroxy- and amino- substituted aryl, aralkyl, alkaryl or alkyl groups, and most preferred are the hydroxyphenyls, especially the 3- and 4-hydroxyphenyl groups and 2,4-dihydroxyphenyl, hydroxytolyls, hydroxybenzyls (hydroxymethylphenyl), hydroxybiphenyls, hydroxynaphthyls, hydroxycyclohexyls, hydroxymethyls, and hydroxypropyls, and the corresponding amino-substituted groups, especially those substituted with —NRH wherein R is an alkyl or aryl radical having from 1 to 10 carbon atoms, such as for example methyl, ethyl, propyl, i-propyl, n-, i-, or t-butyl, pentyl, hexyl, heptyl, octyl, nonyl, and decyl, phenyl, benzyl, tolyl, xylyl, naphthyl, and biphenyl.

The anion a.2) may further comprise a single Group 5–15 element or a plurality of Group 5–15 elements but is preferably a single coordination complex comprising a charge-bearing metal or metalloid core. Preferred anions a.2) are those containing a single coordination complex comprising a charge-bearing metal or metalloid core carrying the at least one substituent containing an active hydrogen moiety. Suitable metals for the anions of ionic compounds (a) include, but are not limited to, aluminum, gold, platinum and the like. Suitable metalloids include, but are not limited to elements of groups 13, 14, and 15, of the Periodic Table of the Elements, preferably are, boron, phosphorus, and silicon. Ionic compounds which contain anions comprising a coordination complex containing a single boron atom and one or more substituents comprising an active hydrogen moiety are preferred. Examples of suitable anions comprising a single Group 5–15 element are disclosed in EP 0 277 004 and examples of those having a plurality of Group 5–15 elements are disclosed in EP 0 277 003, with the proviso that at least one of the subsituents in the anions described therein is substituted by a substituent comprising an active hydrogen moiety, preferably $G_q(T—H)_r$.

Preferably, anions a.2) may be represented by a single coordination complex of the following general Formula (II):

$$[M'^{m+}Q_n(G_q(T—H)_r)_z]^{d-} \qquad (II)$$

wherein:
M' is a metal or metalloid selected from Groups 5–15 of the Periodic Table of the Elements;
Q independently in each occurrence is selected from the group consisting of hydride, dihydrocarbylamido, preferably dialkylamido, halide, hydrocarbyloxide, preferably alkoxide and aryloxide, hydrocarbyl, and substituted-hydrocarbyl radicals, including halo-substituted hydrocarbyl radicals, and hydrocarbyl- and halohydrocarbyl-substituted organo-metalloid radicals, the hydrocarbyl portion in each of these groups preferably having from 1 to 20 carbons, with the proviso that in not more than one occurrence is Q halide;
G is a polyvalent hydrocarbon radical having r+1 valencies, and preferably a divalent hydrocarbon radical, bonded to M' and r groups (T—H);
the group (T—H) is a radical wherein T comprises O, S, NR, or PR, the O, S, N, or P atom of which is bonded to hydrogen atom H, wherein R is a hydrocarbon radical, trihydrocarbyl silyl radical, a trihydrocarbyl germyl radical, or hydrogen;
m is an integer from 1 to 7, preferably 3;
n is an integer from 0 to 7, preferably 3;
q is an integer 0 or 1, preferably 1;
r is an integer from 1 to 3, preferably 1;
z is an integer from 1 to 8, preferably 1 or 2;
d is an integer from 1 to 7, preferably 1; and
n+z−m=d.

When q is 0 and polyvalent hydrocarbon radical G is not present, T is bound to M'. Preferred boron-containing anions a.2) which are particularly useful in this invention may be represented by the following general Formula (III):

$$[BQ_{4-z'}(G_q(T—H)_r)_{z'}]^{d-} \qquad (III)$$

wherein:
B is boron in a valence state of 3;
z' is an integer from 1–4, preferably 1 or 2, most preferably 1;
d is 1; and
Q, G, T, H, q, and r are as defined for Formula (II). Preferably, z' is 1 or 2, q is 1, and r is 1.

Illustrative, but not limiting, examples of anions a.2) of ionic compounds to be used in the present invention are boron-containing anions such as:

triphenyl(hydroxyphenyl)borate, triphenyl(2,4-dihydroxyphenyl)borate, tri(p-tolyl)(hydroxyphenyl) borate,
tris-(pentafluorophenyl)(hydroxyphenyl)borate, tris-(2,4-dimethylphenyl)(hydroxyphenyl)borate,
tris-(3,5-dimethylphenyl)(hydroxyphenyl)borate,
tris-(3,5-di-trifluoromethyl-phenyl)(hydroxyphenyl)borate,
tris(pentafluorophenyl)(2-hydroxyethyl)borate, tris (pentafluorophenyl)(4-hydroxybutyl)borate,
tris(pentafluoropheny)(4-hydroxycyclobexyl)borate, tris (pentafluorophenyl)(4-(4'-hydroxyphenyl)phenyl)borate,
tris(pentafluorophenyl)(6-hydroxy-2-naphthyl)borate, and the like.

Further preferred anions a.2) include those containing two substituents containing an active hydrogen moiety, for example: diphenyldi(hydroxyphenyl)borate, diphenyldi(2, 4-dihydroxyphenyl)borate, di(p-tolyl) di(hydroxyphenyl) borate, di(pentafluorophenyl)di-(hydroxyphenyl)borate, di(2,4-dimethylphenyl) di(hydroxyphenyl)borate, di (3,5-dimethylphenyl) di(hydroxyphenyl)borate, di (3,5-di-trifluoromethylphenyl) di(hydroxyphenyl)borate, di(pentafluorophenyl) di(2-hydroxyethyl)borate, di(pentafluorophenyl) di(4-hydroxybutyl)borate, di(pentafluorophenyl) di(4-hydroxycyclohexyl)borate, di(pentafluorophenyl) di(4-(4'-hydroxyphenyl)phenyl) borate, di(pentafluorophenyl) di(6-hydroxy-2-naphthyl) borate, and the like.

Other preferred anions are those above mentioned borates wherein the hydroxy functionality is replaced by an amino NHR functionality wherein R preferably is methyl, ethyl, or t-butyl. A highly preferred anion a.2) is tris (pentafluorophenyl)(4-hydroxyphenyl) borate.

The cationic portion a. 1) of the ionic compound is preferably selected from the group consisting of Bronsted acidic cations, especially ammonium and phosphonium cations or sulfonium cations, carbonium cations, silylium cations, oxonium cations, and cationic oxidizing agents. The cations a.1) and the anions a.2) are used in such ratios as to give a neutral ionic compound.

Bronsted acidic cations may be represented by the following general formula:

$$(L—H)^+$$

wherein:
L is a neutral Lewis base, preferably a nitrogen, phosphorus, oxygen, or sulfur containing Lewis base; and (L—H)⁺ is a Bronsted acid.

Illustrative, but not limiting, examples of Bronsted acidic cations are trihydrocarbyl- and preferably trialkyl-substituted ammonium cations such as triethylammonium, tripropylammonium, tri(n-butyl)ammonium, trimethylammonium, tri(n-butyl)ammonium, and tri(n-octyl)ammonium. Also suitable are N,N-dialkyl anilinium cations such as N,N-dimethylanilinium, N,N-diethyl-anilinium, N,N-2,4,6-pentamethylanilinium, N,N-dimethylbenzylammonium and the like; dialkylammonium cations such as di-(i-propyl)ammonium, dicyclohexylammonium and the like; and triarylphosphonium cations such as triphenylphosphonium, tri(methyl-phenyl)phosphonium, tri(dimethylphenyl)phosphonium, dimethylsulphonium, diethylsulphonium, and diphenylsulphonium.

In a highly preferred embodiment, the Bronsted acidic cation a.1) may be represented by the following general formula:

$$[L^*—H]^+,$$

wherein:
L* is a nitrogen, oxygen, sulfur or phosphorus containing Lewis base which comprises at least one relatively long chain alkyl group. Preferably such L* groups contain from one to three $C_{10-40}$ alkyl groups with a total of from 12 to 100 carbons, more preferably two $C_{10-40}$ alkyl groups and from 21 to 90 total carbons. It is understood that the cation may comprise a mixture of alkyl groups of differing lengths. For example, one suitable cation is the protonated ammonium salt derived from the commercially available long chain amine comprising a mixture of two $C_{14}$, $C_{16}$ or $C_{18}$ alkyl groups and one methyl group. Such amines are available from Witco Corp., under the trade name Kemamine™ T970 1, and from Akzo-Nobel under the trade name Armeen™ M2HT. These preferred cations are described in U.S. provisional application No. 60/014284, filed Mar. 27, 1996, which is incorporated herein by reference. Ionic compounds (a) comprising the cation [L*—H]⁺ can be easily prepared by subjecting an ionic compound comprising the cation [L—H]⁺ and the anion a.2), as prepared in U.S. patent application Ser. No. 08/610,647, filed Mar. 4, 1996 (corresponding to WO-96/28480), to a cation exchange reaction with a [L*—H]⁺ salt.

Illustrative, but not limiting examples of the highly preferred cations a.1) of the ionic compound (a) arc tri-substituted ammonium salts such as:

decyldi(methyl)ammonium, dodecyldi(methyl)ammonium, tetradecyldi(methyl)ammonium, hexaadecyldi(methyl)ammonium,
octadecyldi(methyl)ammonium, eicosyldi(methyl)ammonium,
methyldi(decyl)ammonium, methyldi(dodecyl)ammonium, methyldi(tetradecyl)ammonium, methyldi(hexadecyl)ammonium,
methyldi(octadecyl)ammonium, methyldi(eicosyl)ammonium, tridodecylammonium,
tridodecylammonium, tritetradecylammonium, trihexadecylammonium,
trioctadecylammonium, trieicosylammonium, decyldi(n-butyl)ammonium, dodecyldi(n-butyl)ammmonium, octadecyldi(n-butyl)ammonium,
N,N-didodecylanilinium, N-methyl-N-dodecylanilinium, N,N-di(octadecyl)(2,4,6-trimethylanilinium), cyclohexyldi(dodecyl)ammonium, and methyldi(dodecyl)ammonium.

Suitable similarly substituted sulfonium or phosphonium cations such as, di(decyl)sulfonium, (n-butyl)dodecylsulfonium, tridecylphosphonium, di(octadecyl)methylphosphonium, and tri(tetradecyl)phosphonium, may also be named.

Preferred ionic compounds (b) are di(octadecyl)methylammonium tris(pentafluorophenyl)(hydroxyphenyl)borate, octadecyl dimethylammonium tris(pentafluorophenyl)(hydroxyphenyl)borate and di(octadecyl) (n-butyl)ammonium tris(pentafluorophenyl)(hydroxyphenyl)borate, as well as the amino (-NHR) analogues of these compounds wherein the hydroxyphenyl group is replaced by the aminophenyl group.

A second type of suitable cation corresponds to the formula: ©⁺, wherein ©⁺ is a stable carbonium or silylium ion containing up to 30 nonhydrogen atoms. Suitable examples of cations include tropyllium, triphenylmethylium, benzene(diazonium). Silylium salts have been previously generically disclosed in *J. Chem. Soc. Chem. Comm.*, 1993, 383–384, as well as Lambert, J. B., et. al., *Organometallics*, 1994, 13, 2430–2443. Preferred silylium cations are triethylsilylium, and trimethylsilylium and ether substituted adducts thereof.

Another suitable type of cation comprises a cationic oxidizing agent represented by the formula:

$$Ox^{e+}$$

wherein $Ox^{e+}$ is a cationic oxidizing agent having a charge of e+, and e is an integer from 1 to 3.

Examples of cationic oxidizing agents include: ferrocenium, hydrocarbyl-substituted ferrocenium, $Ag^+$, and $Pb^{2+}$.

In general, the catalyst system can be prepared by combining the catalyst components in any order in a suitable solvent at a temperature within the range from about −100° C. to about 300° C. or by generating the activated catalyst electrochemically as previously explained, followed by wet or dry deposition and impregnation of the support material component. Alternatively, the metallocene complex component and the activator component may be individually deposited on the support material component in any order, optionally with individual solvent removal and/or drying. The activated catalyst may be separately prepared prior to use by combining the respective components. The catalyst and cocatalyst as well as activated catalyst system generally are sensitive to both moisture and oxygen and should be handled and transferred in an inert atmosphere.

The catalyst system of this invention is produced from catalyst components comprising a support material component. Especially suited support materials for the support material component of the catalyst system include polymers, inorganic oxides, metal halides, prepolymerized polymeric substrates or a mixture thereof. A preferred group of support materials is inorganic oxides and includes silica, alumina, silica-alumina, or a mixture thereof. Other suitable support materials include silica, alumina, silica-alumina, or a mixture thereof which has been modified with $TiO_2$, $ZrO_2$, $GeO_2$, $B_2O_3$, or a mixture thereof. Suitable supported catalyst systems are readily prepared by contacting the present metal complexes with the substrate, optionally while subjecting the mixture to heating and/or reduced pressures.

Preferred supports for use in the present invention include highly porous silicas, aluminas, aluminosilicates, and mixtures thereof. The most preferred support material is silica. The support material may be in granular, agglomerated, pelletized, or any other physical form. Suitable materials include, but are not limited to, silicas available from Grace Davison (division of W. R. Grace & Co.) under the designations SD 3216.30, Davison Syloid™ 245, Davison 948 and Davison 952, and from Degussa AG under the designation Aerosil™ 812; and aluminas available from Akzo Chemicals Inc. under the designation Ketzen™ Grade B.

Supports suitable for the present invention preferably have a surface area as determined by nitrogen porosimetry using the B.E.T. method from 10 to about 1000 m²/g, and preferably from about 100 to 600 m²/g. The pore volume of the support, as determined by nitrogen adsorption, advantageously is between 0.1 and 3 cm³/g, preferably from about 0.2 to 2 cm³/g. The average particle size is not critical, but typically is from 0.5 to 500 μm, preferably from 1 to 100 μm.

Both silica and alumina are known to inherently possess small quantities of hydroxyl functionality attached thereto. When used as a support herein, these materials are preferably subjected to a heat treatment and/or chemical treatment to reduce the hydroxyl content thereof. Typical heat treatments are carried out at a temperature from 30° C. to 1000° C. for a duration of 10 minutes to 50 hours in air or an inert atmosphere or under reduced pressure. Typical chemical treatments include contacting with Lewis acid alkylating agents such as trihydrocarbyl aluminum compounds, trihydrocarbylchlorosilane compounds, trihydrocarbylalkoxysilane compounds or similar agents. Preferred silica or alumina materials for use herein have a surface hydroxyl content that is less than 0.8 mmol of hydroxyl groups per gram of solid support, more preferably less than 0.5 mmol per gram. The hydroxyl content may be determined by adding an excess of dialkyl magnesium to a slurry of the solid support and determining the amount of dialkyl magnesium remaining in solution via known techniques. This method is based on the reaction:

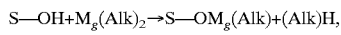

wherein S is the solid support, and Alk is a $C_{1-4}$ alkyl group.

The support may be unfunctionalized (excepting for hydroxyl groups as previously discussed) or functionalized by treating with a silane or chlorosilane functionalizing agent to attach thereto pendant silane —(Si—R)=, or chlorosilane —(Si—Cl)= functionality, wherein R is a $C_{1-10}$ hydrocarbyl group. Suitable functionalizing agents are compounds that react with surface hydroxyl groups of the support or react with the silicon or aluminum of the matrix. Examples of suitable functionalizing agents include phenylsilane, diphenylsilane, methylphenylsilane, dimethylsilane, diethylsilane, chlorofrimethylsilane, hexamethyldisilazane, dichlorosilane, and dichlorodimethylsilane. Techniques for forming such functionalized silica or alumina compounds were previously disclosed in U.S. Pat. Nos. 3,687,920 and 3,879,368, the teachings of which are herein incorporated by reference.

The support may also be treated with an aluminum component selected from an lumoxane or an aluminum compound of the formula $AlR_3$, wherein R independently each occurrence is hydride or $R^1$, and $R^1$ is $C_{1-4}$ alkyl. Preferably, the aluminum component is selected from the group consisting of aluminoxanes and tris($C_{1-4}$ alkyl) aluminum compounds. Most preferred aluminum components are aluminoxanes, trimethylaluminum, triethylaluminum, tri-isobutylaluminum, and mixtures thereof.

Alumoxanes (also referred to as aluminoxanes) are oligomeric or polymeric aluminum oxy compounds containing chains of alternating aluminum and oxygen atoms, whereby the aluminum carries a substituent, preferably an alkyl group. The structure of alumoxane has been believed to be represented by the following general formulae $(-Al(R^1)-O)_{m'}$, for a cyclic alumoxane, and $R^1_2Al-O(-Al(R^1)-O)_{m'}-AlR^1_2$, for a linear compound, wherein $R^1$ is $C_{1-4}$ alkyl, and m' is an integer ranging from 1 to about 50, preferably at least about 4. Alumoxanes are typically the reaction products of water and an alkylaluminum compound, which in addition to an alkyl group may contain halide or alkoxide groups. Reacting a mixture of several different alkylaluminum compounds, such as for example trimethylaluminum and tri-isobutylaluminum, with water yields so-called modified or mixed alumoxanes. Preferred alumoxanes are methylalumoxane and methylalumoxane modified with minor amounts of $C_{2-4}$ alkyl groups, especially isobutyl groups. Alumoxanes generally contain minor to substantial amounts of starting alkylaluminum compound.

Particular techniques for the preparation of alumoxane type compounds by contacting an alkylaluminum compound with an inorganic salt containing water of crystallization are disclosed in U.S. Pat. No. 4,542,119. in a particular preferred embodiment, an alkylaluminum compound is contacted with a regeneratable water-containing substance such as hydrated alumina, silica or other substance. This is disclosed in EP-A-338,044. Thus the alumoxane may be incorporated into the support by reaction of a hydrated alumina or silica material, which has optionally been functionalized with silane, siloxane, hydrocarbyloxysilane, or chlorosilane groups, with a tris($C_{1-10}$ alkyl) aluminum compound according to known techniques. For the teachings contained therein the foregoing patents and publications, or their corresponding equivalent United States applications, are hereby incorporated by reference.

The treatment of the support material in order to include optional alumoxane or trialkylaluminum loadings involves contacting the same with an alumoxane or trialkylaluminum compound before, after, or simultaneously with addition of the complex or activated catalyst. Optionally the mixture can also be heated under an inert atmosphere for a period and at a temperature sufficient to fix the alumoxane, trialkylaluminum compound, complex or catalyst system to the support. Optionally, the treated support component containing alumoxane or the trialkylaluminum compound may be subjected to one or more wash steps, using toluene or similar solvent, to remove excess alumoxane, trialkylaluminum, or any other soluble aluminum compound that is not fixed to the support.

Besides contacting the support with alumoxane, the alumoxane may be generated in situ by contacting an unhydrolyzed silica or alumina or a moistened silica or alumina with a trialkyl aluminum compound optionally in the presence of an inert diluent. Such a process is well known in the art, having been disclosed in EP-A-250,600, U.S. Pat. Nos. 4,912,075, and 5,008,228, the teachings of which, or of the corresponding U.S. application, are hereby incorporated by reference. Suitable aliphatic hydrocarbon diluents include pentane, isopentane, hexane, heptane, octane, isooctane, nonane, isononane, decane, cyclohexane, methylcyclohexane and combinations of two or more of such diluents. Suitable aromatic hydrocarbon diluents are benzene, toluene, xylene, and other alkyl or halogen substituted aromatic compounds. Most preferably, the diluent is an aromatic hydrocarbon, especially toluene. After preparation in the foregoing manner the residual hydroxyl content thereof is desirably reduced to a level less than 1.0 meq of OH per gram of support, by any of the previously disclosed techniques.

The cocatalysts of the invention may also be used in combination with a tri(hydrocarbyl)aluminum compound having from 1 to 10 carbons in each hydrocarbyl group, an oligomeric or polymeric alumoxane compound, a di(hydrocarbyl)(hydrocarbyloxy)aluminum compound having from 1 to 10 carbons in each hydrocarbyl or hydrocarbyloxy group, or a mixture of the foregoing compounds, if desired. These aluminum compounds are usefully employed for their beneficial ability to scavenge impurities such as oxygen, water, and aldehydes from the polymerization mixture. Preferred aluminum compounds include $C_{2-6}$ trialkyl aluminum compounds, especially those wherein the alkyl groups are ethyl, propyl, isopropyl, π-butyl, isobutyl, pentyl, neopentyl, or isopentyl, and methylalumoxane, modified methylalumoxane and diisobutylalumoxane. The molar ratio of aluminum compound to metal complex is preferably from 10,000:1 to 1:1000, more preferably from 5000:1 to 1:100, most preferably from 1:100 to 100:1.

In one embodiment of this invention the catalyst system is produced so that it contains alumoxane in a nonactivating amount. Alternatively, the catalyst system may be produced so that it is essentially alumoxane-free.

The molar ratio of catalyst/cocatalyst employed ranges from 1:1000 to 10:1 preferably ranges from 1:10 to 10:1, more preferably from 1l:5 to 1:1, most preferably from 1:1.2 to 1:1. Mixtures of the activating cocatalysts of the present invention may also be employed if desired.

In a highly preferred embodiment of this invention, the catalyst system of this invention is prepared so that the activator component, preferably comprising a cocatalyst, is used in a range of molar ratios to the metallocene complex component of from about 0.3 to about 5, preferably from about 0.5 to about 2.5, more preferably from about 1 to about 2, and even more preferably from about 1 to about 1.5.

An important factor in realizing high efficiencies with the catalyst system of this invention is the range of catalyst loadings, that is, the amount of the metallocene complex component based on the molar amount of the central metal of the complex relative to the weight of the support material component. Desirably, the metallocene complex component is used in a loading range of from about 0.1 to about 25 μmol/gram of support material component, preferably, from about 0.3 to about 20 μmol/gram of support material component, more preferably, from about 1 to about 20 μmol/gram of support material component.

In most polymerization reactions the molar ratio of catalyst to polymerizable compounds employed is from $10^{-12}:1$ to $10^{-1}:1$, more preferably from $10^{-12}:1$ to $10^{-5}:1$.

Molecular weight control agents can be used in combination with the present cocatalysts. Examples of such molecular weight control agents include hydrogen, trialkyl aluminum compounds or other known chain transfer agents. Hydrogen may be present in the polymerization reactor used for the polymerization process of this invention, desirably in a hydrogen to monomer molar ratio which is less than 0.05, more desirably less than 0.02, and preferably less than 0.01.

The supported catalysts in any of the processes of this invention, whether gas phase, slurry, or any other polymerization process, may be used to polymerize additional polymerizable monomers including ethylenically unsaturated monomers, acetylenic compounds, conjugated or nonconjugated dienes, polyenes, and mixtures thereof. Preferred monomers include olefins, for example, α-olefins having from 2 to 100,000, preferably from 2 to 30, more preferably from 2 to 8 carbon atoms and combinations of two or more of such α-olefins.

Particularly suitable c-olefins include, for example, ethylene, propylene, 1-butene, 1-pentene, 4-methylpentene-1, 1-hexene, 1-heptene, 1-octene, 1-nonene, 1-decene, 1-undecene, 1-dodecene, 1-tridecene, 1-tetradecene, 1-pentadecene, and $C_{16}$–$C_{30}$ α-olefins or combinations thereof, as well as long chain vinyl terminated oligomeric or polymeric reaction products formed during the polymerization. Preferably, the α-olefins are ethylene, propene, 1-butene, 4-methyl-pentene-1,1-hexene, 1-octene, and combinations of ethylene and/or propene with one or more of such other α-olefins. Other preferred monomers include styrene, halo- or alkyl substituted styrenes, tetrafluoroethylene, vinylcyclobutene, vinylcyclohexene, vinylcyclohexane, vinyl chloride, 1,4-hexadiene, dicyclopentadiene, ethylidene norbornene, and 1,7-octadiene. Mixtures of the above-mentioned monomers may also be employed.

A preferred group of olefin comonomers for polymerizations where ethylene is the monomer includes propene, 1-butene, 1-pentene, 4-methyl-1-pentene, 1-hexene, 1-heptene, 1-octene, 1-nonene, 1-decene, 1,7-octadiene, 1,5-hexadiene, 1,4-pentadiene, 1,9-decadiene, ethylidenenorbornene, styrene, or a mixture thereof. For polymerizations wherein propene is the monomer, the preferred comonomers are the same as that immediately previous, but with the inclusion of ethylene instead of propene.

Long chain macromolecular α-olefins can be vinyl terminated polymeric remnants formed in situ during continuous solution polymerization reactions, and in some other polymerization reactions, such as gas phase polymerization reactions. Under suitable process conditions such long chain macromolecular units may be polymerized into the polymer product along with ethylene and other short chain olefin monomers to give small quantities of long chain branching in the resulting polymer.

In general, the polymerization may be accomplished under conditions well known in the prior art for Ziegler-Natta or Kaminsky-Sinn type polymerization reactions. Suspension, solution, slurry, gas phase or high pressure, whether employed in batch or continuous form or other process conditions, may be employed if desired. Examples of such well known polymerization processes are depicted in WO 88/02009, U.S. Pat. Nos. 5,084,534; 5,405,922; 4,588,790; 5,032,652: 4,543,399; 4,564,647; 4.522,987, which are incorporated herein by reference; and elsewhere. Preferred polymerization temperatures are from 0–250° C. Preferred polymerization pressures are from atmospheric to 3000 atmospheres.

In a highly desirable embodiment, the processes of this invention are performed in a single reactor, which may have a single reaction vessel or two or more vessels producing essentially the same polyolefin copolymer composition. Thus, in this embodiment, the polymerization processes of this invention do not produce blends, or where more than one reaction vessel is used do not require blending to produce essentially homogeneous polyolefin copolymer compositions. Alternatively, the catalyst system may employ more than one metallocene complex, or even a nonmetallocene component, to produce reactor blends.

In an important aspect of this invention, which contributes to the high catalyst efficiencies obtainable with the catalyst system of this invention, it is desirable that the catalyst system is used at a catalyst concentration in the range of about $0.01 \times 10^{-6}$ to about $6 \times 10^{-6}$ moles active catalyst/mole monomer, more desirably, at a catalyst concentration in the range of about $0.01 \times 10^{-6}$ to about $5.0 \times 10^{-6}$ moles active catalyst/mole monomer, preferably, at a catalyst concentration in the range of about $0.02 \times 10^{-6}$ to about $3.0 \times 10^{-6}$ moles active catalyst/mole monomer, more preferably, at a catalyst concentration in the range of about $0.05 \times 10^{-6}$ to about $3.0 \times 10^{-6}$ moles active catalyst/mole monomer, and still more preferably, at a catalyst concentration in the range of about $0.1 \times 10^{-6}$ to about $3.0 \times 10^{-6}$ moles active catalyst/mole monomer. Active catalyst is defined in this context as the central metal of the metallocene complex of the metallocene complex component of the catalyst system.

Use of the catalyst system of this invention in the polymerization process thereof results in a catalyst efficiency that is at least 24,000,000 g polymer/mole catalyst/hour, desirably, at least 48,000,000 g polymer/mole catalyst/hour, more desirably, at least 72,000,000 g polymer/mole catalyst/hour, even better, at least 96,000,000 g polymer/mole catalyst/hour, still better, at least 144,000,000 g polymer/mole catalyst/hour, even better than that, at least 240,000,000 g polymer/mole catalyst/hour, better still, at least 384,000,000 g polymer/mole catalyst/hour. As used in relationship to the term "catalyst efficiency", the mass of polymer, in grams, refers to the mass of polymer produced in the polymerization process relative to the mass, in moles, of the active catalyst required per hour. If the catalyst system is employed in one of the alternative methods described herein, the mass of the catalyst system is simply the sum of the masses of the catalyst components.

The polymerization process of this invention may be conducted under those generally useful for slurry polymerization processes. A description of the slurry process can be found in Volume 6 of the *Encyclopedia of Polymer Science and Engineering* (John Wiley and Sons) pages 472 to 477 (1986).

By conducting the slurry polymerization under appropriately controlled reaction conditions, the polymer being formed around the solid catalyst system is not melted or dissolved during the polymerization reaction, but maintains a discrete form, which, preferably, is a granular or powdery form during the reaction.

When a polymerization reaction is conducted under slurry process conditions, the polymerization pressure is generally from 1 to 100 atm, preferably from 3 to 30 atm, and the polymerization temperature is generally from 20 to 115° C. preferably from 50 to 105° C. However, the upper limit of the polymerization temperature is a temperature above which the polymer produced does not maintain its discrete state, and this varies depending on the type and density of the polymer produced and the type of diluent used.

As a diluent to be used for slurry polymerization, typical inert aliphatic or aromatic hydrocarbon solvents can be suitably used, including xylene, benzene, toluene, isobutane, isopentane, heptane, hexane and octane. Hexane, isobutane and isopentane are especially preferred.

In producing a polymer by the process of this invention under slurry conditions, the molecular weight can be controlled by changing the concentration of hydrogen in the reaction system or by changing the polymerization temperature, as described in EP 69951, DE 3127133.2, and U.S. Pat. No. 4,542,199 which are hereby incorporated herein by reference.

The process of the present invention can be employed to advantage in the gas phase polymerization and copolymerization of olefins. Gas phase processes for the polymerization of olefins, especially the homopolymerization and copolymerization of ethylene and propylene, and the copolymerization of ethylene with higher α-olefins such as, for example, 1-butene, 1-hexene, 4-methyl-1-pentene, are well known in the art.

The gas phase process employed can be, for example, of the type which employs a mechanically stirred bed or a gas fluidized bed as the polymerization reaction zone. Preferred is the process wherein the polymerization reaction is carried out in a vertical cylindrical polymerization reactor containing a fluidized bed of polymer particles supported above a perforated plate, fluidization grid, by a flow of fluidization gas.

The gas employed to fluidize the bed comprises the monomer or monomers to be polymerized, and also serves as a heat exchange medium to remove the heat of reaction from the bed. The hot gases emerge from the top of the reactor, normally via a tranquilization zone, also known as a velocity reduction zone, having a wider diameter than the fluidized bed and wherein fine particles entrained in the gas stream have an opportunity to gravitate back into the bed. It can also be advantageous to use a cyclone to remove ultra-fine particles from the hot gas stream. The gas is then normally recycled to the bed by means of a blower or compressor and one or more heat exchangers to strip the gas of the heat of polymerization.

A preferred method of cooling the bed, in addition to the cooling provided by the cooled recycle gas, is to feed a volatile liquid to the bed to provide an evaporative cooling effect. The volatile liquid employed in this case can be, for example, a volatile inert liquid, for example, a saturated hydrocarbon having about 3 to about 8, preferably 4 to 6, carbon atoms. In the case that the monomer or comonomer itself is a volatile liquid, or can be condensed to provide such a liquid, this can suitably be fed to the bed to provide an evaporative cooling effect. Examples of olefin monomers which can be employed in this manner are olefins containing about three to about eight, preferably three to six carbon atoms. The volatile liquid evaporates in the hot fluidized bed to form gas which mixes with the fluidizing gas. If the volatile liquid is a monomer or comonomer, it will undergo some polymerization in the bed. The evaporated liquid then emerges from the reactor as part of the hot recycle gas, and enters the compression/heat exchange part of the recycle loop. The recycle gas is cooled in the heat exchanger and, if the temperature to which the gas is cooled is below the dew point, liquid will precipitate from the gas. This liquid is desirably recycled continuously to the fluidized bed. It is possible to recycle the precipitated liquid to the bed as liquid droplets carried in the recycle gas stream. This type of process is described, for example in EP 89691; U.S. Pat. No. 4,543,399; WO 94/25495 and U.S. Pat. No. 5,352,749, which are hereby incorporated by reference. A particularly preferred method of recycling the liquid to the bed is to separate the liquid from the recycle gas stream and to reinject this liquid directly into the bed, preferably using a method which generates fine droplets of the liquid within the bed. This type of process is described in BP Chemicals' WO 94/28032, which is hereby incorporated by reference.

The polymerization reaction occurring in the gas fluidized bed is catalyzed by the continuous or semi-continuous addition of the catalyst components of the catalyst system or of the catalyst system as a whole. In a highly desirable method of operation, the catalyst components are produced outside the reactor, the process comprising:

1) depositing one or more metallocene complexes on individual metallocene support portions of the support material component or on a common metallocene support to form one or more individually supported metallocene complex components;

2) depositing one or more cocatalysts on individual cocatalyst support portions of the support material component or on a common cocatalyst support to form one or more individually supported cocatalyst components; and 3) combining together in any order one or more of the metallocene components from 1) and the cocatalyst components from 2) to form the catalyst system prior to introduction of the catalyst system into the reactor; or 4) introducing one or more of the individually supported metallocene components from 1) and the individually supported cocatalyst components from 2) into the reactor individually.

The polymer is produced directly in the fluidized bed by catalyzed copolymerization of the monomer and one or more comonomers on the fluidized particles of catalyst, supported catalyst or prepolymer within the bed. Start-up of the polymerization reaction is achieved using a bed of preformed polymer particles, preferably similar to the target polyolefin, and conditioning the bed by drying with inert gas or nitrogen prior to introducing the catalyst, the monomer(s) and any other gases which it is desired to have in the recycle gas stream, such as a diluent gas, hydrogen chain transfer agent, or an inert condensable gas when operating in gas phase condensing mode. The produced polymer is discharged continuously or discontinuously from the fluidized bed as desired. Such processes are used commercially on a large scale for the manufacture of high density polyethylene (HDPE), medium density polyethylene (MDPE), linear low density polyethylene (LLDPE) and polypropylene.

The gas phase processes suitable for the practice of this invention are preferably continuous processes which provide for the continuous supply of reactants to the reaction zone of the reactor and the removal of products from the reaction zone of the reactor, thereby providing a steady-state environment on the macro scale in the reaction zone of the reactor.

Typically, the fluidized bed of the gas phase process is operated at temperatures greater than 50° C., preferably, greater than about 60° C. and from about 60° C. to about 110° C., more preferably, greater than about 70° C. and from about 70° C. to about 110° C., even more preferably, greater than about 80° C.

Typically the molar ratio of comonomer to monomer used in the polymerization depends upon the desired density for the composition being produced and is about 0.5 or less. Desirably, where the polymerization is a copolymerization of ethylene or propylene as the monomer and of one or more α-olefin comonomers, the process of this invention employs a comonomer to monomer molar ratio which is less than 0.1, preferably less than 0.05, and more preferably less than 0.01.

For many polymerizations where it is desirable to use hydrogen as a chain transfer agent, it is desirable that the polymerization reactor contain hydrogen in a hydrogen to monomer molar ratio which is less than 0.05, preferably less than 0.02, more preferably less than 0.01.

Desirably, when producing polymers with a density range of from about 0.85 to about 0.98, the comonomer to monomer molar ratio is less than 0.1, the hydrogen to monomer ratio is less than 0.05, and the composition is produced in a reactor with a reaction zone having a temperature of 70° C. or higher.

Desirably, when producing polymers with a density range of from about 0.910 to about 0.925, the comonomer to monomer molar ratio is less than 0.02, the hydrogen to monomer ratio is less than 0.02, and the composition is produced in a reactor with a reaction zone having a temperature of 70° C. or higher.

Desirably, when producing materials with a density range of from about 0.91 to about 0.93 the comonomer to monomer ratio is less than 0.2, preferably less than 0.05, even more preferably less than 0.02, and may even be less than 0.01. Typically, the ratio of hydrogen to monomer is less than about 0.5, preferably less than 0.2, more preferably less than 0.05, even more preferably less than 0.02 and may even be less than 0.01.

The above-described ranges of process variables are appropriate for the gas phase process of this invention and may be suitable for other processes adaptable to the practice of this invention.

A number of patents and patent applications describe gas phase processes which are adaptable for use in the process of this invention, particularly, U.S. Pat. Nos. 4,588,790. 4,543,399; 5,352,749; 5,436,304; 5,405,922; 5,462,999; 5,461,123; 5,453,471; 5,032,562; 5,028,670; 5,473,028; 5,106,804; 5,556,238; 5,541,270; 5,608,019; 5,616,661; and EP applications 659,773; 692,500; 780,404; 697,420; 628, 343; 593,083; 676,421; 683,176; 699,212; 699,213; 721, 798; 728,150; 728,151; 728,771; 728,772; 735,058; and PCT Applications WO 94/29032; WO 94/25497; WO 94/25495; WO 94/28032; WO 95/13305; WO 94/26793, WO 95/07942; WO 97/25355; WO 93/11171; WO 95/13305; and WO 95/13306, all of which are hereby incorporated herein by reference.

The skilled artisan will appreciate that the invention disclosed herein may be practiced in the absence of any component which has not been specifically disclosed. The following examples are provided in order to further illustrate the invention and are not to be construed as limiting. Unless stated to the contrary, all parts and percentages are expressed on a weight basis.

Experimental

The polymerization examples which follow were carried out in a 13 liter gas phase reactor having a four inch diameter thirty inch long fluidization zone and an eight inch diameter ten inch long velocity reduction zone which are connected by a transition section having tapered walls. Typical operating ranges are 40 to 1 100° C., 250 to 350 psia total pressure and up to 8 hours reaction time. Ethylene, comonomer, hydrogen and nitrogen enter the bottom of the reactor where they pass through a gas distributor plate. The flow of the gas is 2 to 8 times the minimum particle fluidization velocity [*Fluidization Engineering,* 2nd Ed., D. Kunii and O. Levenspiel, 1991, Butterworth-Heinemann]. Most of the suspended solids disengage in the velocity reduction zone. The reactant gases exit the top of the velocity reduction zone and pass through a dust filter to remove any fines. The gases then pass through a gas booster pump. The polymer is allowed to accumulate in the reactor over the course of the reaction. The total system pressure is kept constant during the reaction by regulating the flow of monomer into the reactor. Polymer is removed from the reactor to a recovery vessel by opening a valve located at the bottom of the fluidization zone. The polymer recovery vessel is kept at a lower pressure than the reactor. The pressures of ethylene, comonomer and hydrogen reported refer to partial pressures.

The mode of reactor operation which was employed is referred to as semi-batch. The catalyst was prepared and loaded into a catalyst injector in an inert atmosphere glovebox. The injector was removed from the glovebox and inserted into the top of the reactor. Appropriate amounts of ethylene, 1-butene, hydrogen and nitrogen were introduced into the reactor to bring the total pressure to 300 psia. The catalyst was then injected and the polymer was usually allowed to form for 30 minutes. The total system pressure was kept constant during the reaction by regulating the flow of monomer into the reactor. After 30 minutes the reactor was emptied and the polymer powder was collected.

Several different silica pretreatment procedures were used. One pretreatment procedure involved first drying approximately 2 grams of the silica under a nitrogen purge at 200° C. for several hours. The silica was removed from the drying oven and mixed with a quantity of distilled water equal to 3 weight percent of the silica. The silica containing the water was shaken for about ten minutes to disperse the water evenly and to break up the lumps which formed on addition of the water. The silica was then brought into an inert atmosphere glovebox where in a toluene slurry it was then treated with triethyl aluminum (TEA) in a amount corresponding to an $Al/H_2O$ molar ratio of 2/1. The silica was then filtered and washed several times with toluene to remove any residual soluble aluminum compounds which may have resulted during the dehydration step. The supports were then dried under reduced pressure to give a free flowing powder.

A second pretreatment procedure involved first drying approximately 5 grams of the silica under a nitrogen purge at 500° C. for 4 hours. The silica was removed from the drying furnace and brought into an inert atmospheric glovebox where in a toluene slurry it was treated with TEA in an amount corresponding to an Al/OH ratio of 1/1. This corresponded to a TEA/silica ratio of 1.2 mmoles TEA/g silica. The silica was then filtered and washed several times with toluene to remove any residual soluble aluminum compounds which may have resulted during the dehydration step. The supports were then dried under reduced pressure to give a free flowing powder.

Preparation of a typical supported catalyst involved first preparing 0.005 M solutions of $(\eta^5\text{-}C_5Me_4SiMe_2NCMe_3)Ti(Me_2)$ and of $(\eta^5\text{-}C_5Me_4SiMe_2NCMe_3)Ti(s\text{-}trans\text{-}\eta^4\text{-}1,4\text{-}trans, trans\text{-}diphenyl\text{-}1,3\text{-}butadiene)$ and of $(\eta^5\text{-}C_5Me_4SiMe_2NCMe_3)\text{-}Ti(\eta^4\text{-}C_5H_8)$ catalyst and borane $([B(C_6F_5)_3])$ cocatalyst in toluene. An appropriate amount (typically 100 to 300 Al) of toluene was added to the silica to pre-wet the support. An appropriate amount of the metallocene catalyst was then added to the silica followed by addition of an appropriate amount of the cocatalyst. The solvents were then removed under vacuum from the agitated slurry to give the catalyst as a free-flowing powder.

EXAMPLE 1

Catalyst/support preparation

2 Grams of Davison type 948 silica was heated at 200° C. for 4 hours in an inert stream of nitrogen. The silica was removed from the drying oven and mixed with 60 mg of distilled water (3 weight percent based on silica). The silica containing the water was shaken for about ten minutes to disperse the water evenly and to break up the lumps which formed on addition of the water. The silica was transferred into an inert atmosphere glovebox where it was then treated with TEA. The silica was suspended in an amount of dry toluene followed by the slow addition of 855 mg of TEA. The amount of TEA which was added corresponded to a water/TEA ratio of 1/2. The silica was then washed several times with toluene to remove any residual soluble aluminum compounds which may have resulted during the TEA treatment step.

An aliquot (480 µl) of a 0.005 M solution (2.4 µmol) of $(\eta^5\text{-}C_5Me_4SiMe_2NCMe_3)\text{-}Ti(Me_2)$ in toluene was combined with 0.005 grams of the pretreated Davison 948 silica described above which had already been prewetted with ~200 µl of dry toluene. An aliquot (480 µl) of a 0.005 M solution (2.4 µmol) of $B(C_6F_5)_3$ in toluene was then added to the slurried silica. The solvent was removed to give a free-flowing powder.

Polymerization

The catalyst described above was added to the semi-batch gas phase reactor which was under an ethylene pressure of 240 psi, a 1-butene pressure of 5.4 psi, a hydrogen pressure of 1.3 psi and a nitrogen pressure of 53 psi. The temperature throughout the polymerization was 79° C. No exotherm was measured upon injection of the catalyst into the reactor. 3.7 Grams of polymer were recovered after 30 minutes. The results of this run are shown in Table 2.

EXAMPLE 2

An aliquot (960 µl) of a 0.005 M solution (4.8 µmol) of $(\eta^5\text{-}C_5Me_4SiMe_2NCMe_3)\text{-}Ti(Me_2)$ in toluene was combined with 0.01 grams of the pretreated Davison 948 silica described above in Example 1 which had already been prewetted with ~200 µl of dry toluene. An aliquot (1920 µl) of a 0.005 M solution (9.6 µmol) of $B(C_6F_5)_3$ in toluene was then added to the slurried silica. The solvent was removed to give a free-flowing powder. The catalyst described above was added to the semi-batch gas phase reactor which was under an ethylene pressure of 240 psi, a 1-butene pressure of 5.4 psi, an hydrogen pressure of 1.3 psi and a nitrogen pressure of 53 psi. The temperature throughout the polymerization was 81° C. No exotherm was measured upon injection of the catalyst into the reactor. 3.7 Grams of polymer were recovered after 30 minutes. The results of this run are shown in Table 2.

EXAMPLE 3

An aliquot (600 µl) of a 0.005 M solution (3.0 µl) of $(\eta^5\text{-}C_5Me_4SiMe_2NCMe_3)\text{-}Ti(Me_2)$ in toluene was combined with 0.01 grams of the pretreated Davison 948 silica described above in Example 1 which had already been prewetted with ~200 µl of dry toluene. An aliquot (1,800 µl) of a 0.005 M solution (9.0 µmol) of $B(C_6F_5)_3$ in toluene was then added to the slurried silica. The solvent was removed to give a free-flowing powder. The catalyst described above was added to the semi-batch gas phase reactor which was under an ethylene pressure of 240 psi, a 1-butene pressure of 5.4 psi, an hydrogen pressure of 1.3 psi and a nitrogen pressure of 53 psi. The temperature throughout the polymerization was 77° C. A 4° C. was measured upon injection of the catalyst into the reactor. 6.3 Grams of polymer were recovered after 30 minutes. The results of this run are shown in Table 2.

EXAMPLE 4

An aliquot (400 µl) of a 0.005 M solution (2.0 µmol) of $(\eta^5\text{-}C_5Me_4SiMe_2NCMe_3)\text{-}Ti(Me_2)$ in toluene was combined with 0.01 grams of the pretreated Davison 948 silica described above in Example 1 which had already been prewetted with ~200 µl of dry toluene. An aliquot (1,200 µl) of a 0.005 M solution (6.0 µmol) of $B(C_6F_5)_3$ in toluene was then added to the slurried silica. The solvent was removed to give a free-flowing powder. The catalyst described above was added to the semi-batch gas phase reactor which was under an ethylene pressure of 240 psi, a 1-butene pressure of 5.4 psi, an hydrogen pressure of 1.3 psi and a nitrogen pressure of 53 psi. The temperature throughout the polymerization was 78° C. No exotherm was measured upon injection of the catalyst into the reactor. 2.4 Grams of polymer were recovered after 30 minutes. The results of this run are shown in Table 2.

EXAMPLE 5

An aliquot (1,000 µl) of a 0.005 M solution (5.0 µmol) of $(\eta^5\text{-}C_5Me_4SiMe_2NCMe_3)\text{-}Ti(Me_2)$ in toluene was combined with 0.05 grams of the pretreated Davison 948 silica described above in Example 1 which had already been prewetted with ~200 µl of dry toluene. An aliquot (1,250 µl) of a 0.005 M solution (6.25 µmol) of $B(C_6F_5)_3$ in toluene was then added to the slurried silica. The solvent was removed to give a free-flowing powder. The catalyst described above was added to the semi-batch gas phase reactor which was under an ethylene pressure of 240 psi, a 1-butene pressure of 5.4 psi, an hydrogen pressure of 1.3 psi and a nitrogen pressure of 53 psi. The temperature throughout the polymerization was 82° C. No exotherm was measured upon injection of the catalyst into the reactor. 11.8 Grams of polymer were recovered after 30 minutes. The results of this run are shown in Table 2.

EXAMPLE 6

An aliquot (600 µl) of a 0.005 M solution (3.0 µmol) of $(\eta^5\text{-}C_5Me_4SiMe_2NCMe_3)\text{-}Ti(Me_2)$ in toluene was combined with 0.05 grams of the pretreated Davison 948 silica described above in Example 1 which had already been prewetted with ~200 µl of dry toluene. An aliquot (1800 µl) of a 0.005 M solution (9.0 µmol) of $B(C_6F_5)_3$ in toluene was then added to the slurried silica. The solvent was removed to give a free-flowing powder. The catalyst described above was added to the semi-batch gas phase reactor which was under an ethylene pressure of 240 psi, a 1-butene pressure of 5.4 psi, an hydrogen pressure of 1.3 psi and a nitrogen pressure of 53 psi. The temperature throughout the polymerization was 80° C. No exotherm was measured upon injection of the catalyst into the reactor. 9.4 Grams of

EXAMPLE 7

An aliquot (600 µl) of a 0.005 M solution (3.0 µl) of ($\eta^5$-C$_5$Me$_4$SiMe$_2$NCMe$_3$)-Ti(Me$_2$) in toluene was combined with 0.10 grams of the retreated Davison 948 silica described above in Example 1 which had already been prewetted with ~200 µl of dry toluene. An aliquot (1,800 µl) of a 0.005 M solution (9.0 µmol) of B(C$_6$F$_5$)$_3$ in toluene was then added to the slurried silica. The solvent was removed to give a free-flowing powder. The catalyst described above was added to the semi-batch gas phase reactor which was under an ethylene pressure of 240 psi, a 1-butene pressure of 5.4 psi, an hydrogen pressure of 1.3 psi and a nitrogen pressure of 53 psi. The temperature throughout the polymerization was 80° C. A 4° C. exotherm was measured upon injection of the catalyst into the reactor. 35.2 Grams of polymer were recovered after 30 minutes. The results of this run are shown in Table 2.

EXAMPLE 8

An aliquot (200 µl) of a 0.005 M solution (1.0 µmol) of ($\eta^5$-C$_5$Me$_4$SiMC$_2$NCMe$_3$)-Ti(Me$_2$) in toluene was combined with 0.10 grams of Crosfield ES70Y silica which had been pretreated in a manner similar to Davison 948 in the previous example. The 0.10 grams of ES70Y silica was prewetted with ~200 µl of dry toluene. An aliquot (~200 µl) of a 0.005 M solution (1.0 µmol) of B(C$_6$F$_5$)$_3$ in toluene was then added to the slurried silica. The solvent was removed to give a free-flowing powder. The catalyst described above was added to the semi-batch gas phase reactor which was under an ethylene pressure of 240 psi, a 1-butene pressure of 5.4 psi, an hydrogen pressure of 1.3 psi and a nitrogen pressure of 53 psi. The temperature throughout the polymerization was 70° C. 14.1 Grams of polymer were recovered after 30 minutes. The results of this run are shown in Table 2.

EXAMPLE 9

Catalyst/support preparation

5 Grams of Davison type 948 silica was heated at 150° C. for 16 hours. The silica was removed from the drying oven and mixed with 125 ml of toluene. To the slurry was added 1.25 ml of TEA. After reacting for 15 minutes the mixture was filtered, washed with about 50 ml toluene, then dried under vacuum. The amount of TEA which was added corresponded to a TEA/silica ratio of 0.25 ml TEA/g silica.

An aliquot (400 µl) of a 0.005 M solution (2.0 µmol) of ($\eta^5$-C$_5$Me$_4$SiMe$_2$NCMe$_3$)-Ti(s-trans-$\eta^4$-1,4-trans, trans-diphenyl-1,3-butadiene) in toluene was combined with 0.005 grams of the pretreated Davison 948 silica described above which had already been prewetted with ~200 µl of dry toluene. An aliquot (1,200 µl) of a 0.005 M solution (6.0 µmol) of B(C$_6$F$_5$)$_3$ in toluene was then added to the slurried silica. The solvent was removed to give a free-flowing powder.

Polymerization

The catalyst described above was added to the semi-batch gas phase reactor which was under an ethylene pressure of 240 psi, a 1-butene pressure of 5.4 psi, an hydrogen pressure of 1.3 psi and a nitrogen pressure of 53 psi. The temperature throughout the polymerization was 64° C. No exotherm was measured upon injection of the catalyst into the reactor. 9.9 Grams of polymer were recovered after 95 minutes. The results of this run are shown in Table 3.

EXAMPLE 10

An aliquot (1000 µl) of a 0.005 M solution (5.0 µmol) of ($\eta^5$-C$_5$Me$_4$SiMe$_2$NCMe$_3$)-Ti($\eta^4$-C$_5$H$_8$) in toluene was combined with 0.05 grams of the pretreated Davison 948 silica described above in Example 1 which had already been prewetted with ~200 µl of dry toluene. An aliquot (1250 µl) of a 0.005 M solution (6.25 µmol) of B(C$_6$F$_5$)$_3$ in toluene was then added to the slurried silica. The solvent was removed to give a free-flowing powder. The catalyst described above was added to the semi-batch gas phase reactor which was under an ethylene pressure of 240 psi, a 1-butene pressure of 5.4 psi, an hydrogen pressure of 1.3 psi and a nitrogen pressure of 53 psi. The temperature throughout the polymerization was 82° C. No exotherm was measured upon injection of the catalyst into the reactor. 11.8 Grams of polymer were recovered after 30 minutes. The results of this run are shown in Table 3.

EXAMPLE 11

An aliquot (920 µl) of a 0.005 M solution (4.6 µmol) of ($\eta^5$-C$_5$Me$_4$SiMe$_2$NCMe$_3$)-Ti($\eta^4$-C$_5$H$_8$) in toluene was combined with 0.1 grams of the pretreated Davison 948 silica described above in Example 1 which had already been prewetted with ~200 µl of dry toluene. An aliquot (1020 µl) of a 0.005 M solution (5.1 µmol) of B(C$_6$F$_5$)$_3$ in toluene was then added to the slurried silica. The solvent was removed to give a free-flowing powder. The catalyst described above was added to the semi-batch gas phase reactor which was under an ethylene pressure of 240 psi, a 1-butene pressure of 5.4 psi, an hydrogen pressure of 1.3 psi and a nitrogen pressure of 53 psi. The temperature throughout the polymerization was 80° C. A 4° C. exotherm was measured upon injection of the catalyst into the reactor. 20.4 Grams of polymer were recovered after 30 minutes. The results of this run are shown in Table 3.

EXAMPLE 12

An aliquot (200 µl) of a 0.005 M solution (1 µmol) of ($\eta^5$-C$_5$Me$_4$SiMe$_2$NCMe$_3$)-Ti($\eta^4$-C$_5$H$_8$) in toluene was combined with 0.03 grams of the pretreated Davison 948 silica described above in Example 1 which had already been prewetted with ~200 µl of dry toluene. An aliquot (600 µl) of a 0.005 M solution (3 µmol) of B(C$_6$F$_5$)$_3$ in toluene was then added to the slurried silica. The solvent was removed to give a free-flowing powder. The catalyst described above was added to the semi-batch gas phase reactor which was under an ethylene pressure of 240 psi, a 1-butene pressure of 5.4 psi, an hydrogen pressure of 1.3 psi and a nitrogen pressure of 53 psi. The temperature throughout the polymerization was 79° C. A 2° C. exotherm was measured upon injection of the catalyst into the reactor. 4.6 Grams of polymer were recovered after 30 minutes. The results of this run are shown in Table 3.

EXAMPLE 13

An aliquot (160 µl) of a 0.005 M solution (0.8 µmol) of ($\eta^5$-C$_5$Me$_4$SiMe$_2$NCMe$_3$)-Ti($\eta^4$-C$_5$H$_8$) in toluene was combined with 0.035 grams of the pretreated Davison 948 silica described above in Example 1 which had already been prewetted with ~200 µl of dry toluene. An aliquot (180 µl) of a 0.005 M solution (0.9 µmol) of B(C$_6$F$_5$)$_3$ in toluene was then added to the slurried silica. The solvent was removed to give a free-flowing powder. The catalyst described above was added to the semi-batch gas phase reactor which was under an ethylene pressure of 240 psi, a 1-butene pressure of 5.4 psi, an hydrogen pressure of 1.3 psi and a nitrogen pressure of 53 psi. The temperature throughout the polymerization was 76° C. No exotherm was measured upon injection of the catalyst into the reactor. 11.7 Grams of polymer were recovered after 26 minutes. The results of this run are shown in Table 3.

EXAMPLE 14

An aliquot (400 μl) of a 0.005 M solution (2 μmol) of ($\eta^5$-$C_5Me_4SiMe_2NMe_3$)-Ti($\eta^4$-$C_5H_8$) in toluene was combined with 0.1 grams of the pretreated Davison 948 silica described above in Example 1 which had already been prewetted with ~200 μl of dry toluene. An aliquot (1200 μl) of a 0.005 M solution (6 μmol) of $B(C_6F_5)_3$ in toluene was then added to the slurried silica. The solvent was removed to give a free-flowing powder. The catalyst described above was added to the semi-batch gas phase reactor which was under an ethylene pressure of 240 psi, a 1-butene pressure of 5.4 psi, an hydrogen pressure of 1.3 psi and a nitrogen pressure of 53 psi. The temperature throughout the polymerization was 76° C. A 2° C. exotherm was measured upon injection of the catalyst into the reactor. 27.7 Grams of polymer were recovered after 21 minutes. The results of this run are shown in Table 3.

EXAMPLE 15

An aliquot (120 μl) of a 0.005 M solution (0.6 μmol) of ($\eta^5$-$C_5Me_4SiMe_2NMe_3$)-Ti($\eta^4$-$C_5H_8$) in toluene was combined with 0.05 grams of the pretreated Davison 948 silica described above in Example 1 which had already been prewetted with ~200 μl of dry toluene. An aliquot (140 μl) of a 0.005 M solution (0.7 μmol) of $B(C_6F_5)_3$ in toluene was then added to the slurried silica. The solvent was removed to give a free-flowing powder. The catalyst described above was added to the semi-batch gas phase reactor which was under an ethylene pressure of 240 psi, a 1-butene pressure of 5.4 psi, an hydrogen pressure of 1.3 psi and a nitrogen pressure of 53 psi. The temperature throughout the polymerization was 71° C. No exotherm was measured upon injection of the catalyst into the reactor. 18.3 Grams of polymer were recovered after 30 minutes. The results of this run are shown in Table 3.

EXAMPLE 16

An aliquot (~200 μl) of a 0.005 M solution (1 μmol) of ($\eta^5$-$C_5Me_4SiMe_2NMe_3$)-Ti($\eta^4$-$C_5H_8$) in toluene was combined with 0.1 grams of the pretreated Davison 948 silica described above in Example 1 which had already been prewetted with ~200 μl of dry toluene. An aliquot (600 μl) of a 0.005 M solution (3 μmol) of $B(C_6F_5)_3$ in toluene was then added to the slurried silica. The solvent was removed to give a free-flowing powder. The catalyst described above was added to the semi-batch gas phase reactor which was under an ethylene pressure of 240 psi, a 1-butene pressure of 5.4 psi, an hydrogen pressure of 1.3 psi and a nitrogen pressure of 53 psi. The temperature throughout the polymerization was 77° C. A 3° C. exotherm was measured upon injection of the catalyst into the reactor. 48.8 Grams of polymer were recovered after 16.4 minutes. The results of this run are shown in Table 3.

EXAMPLE 17

An aliquot (160 μl) of a 0.005 M solution (0.8 μmol) of ($\eta^5$-$C_5Me_4SiMe_2NMe_3$)-Ti($\eta^4$-$C_5H_8$) in toluene was combined with 0.1 grams of the pretreated Davison 948 silica described above in Example 1 which had already been prewetted with ~200 μl of dry toluene. An aliquot (180 μl) of a 0.005 M solution (0.9 μmol) of $B(C_6F_5)_3$ in toluene was then added to the slurried silica. The solvent was removed to give a free-flowing powder. The catalyst described above was added to the semi-batch gas phase reactor which was under an ethylene pressure of 240 psi, a 1-butene pressure of 5.4 psi, an hydrogen pressure of 1.3 psi and a nitrogen pressure of 53 psi. The temperature throughout the polymerization was 78° C. An 8° C. exotherm was measured upon injection of the catalyst into the reactor. 41.6 Grams of polymer were recovered after 30 minutes. The results of this run are shown in Table 3.

EXAMPLE 18

An aliquot (160 μl) of a 0.005 M solution (0.8 μmol) of ($\eta^5$-$C_5Me_4SiMe_2NMe_3$)-Ti($\eta^4$-$C_5H_8$) in toluene was combined with 0.4 grams of the pretreated Davison 948 silica described above in Example 1 which had already been prewetted with ~200 μl of dry toluene. An aliquot (180 μl) of a 0.005 M solution (0.9 μmol) of $B(C_6F_5)_3$ in toluene was then added to the slurried silica. The solvent was removed to give a free-flowing powder. The catalyst described above was added to the semi-batch gas phase reactor which was under an ethylene pressure of 240 psi, a 1-butene pressure of 5.4 psi, an hydrogen pressure of 1.3 psi and a nitrogen pressure of 53 psi. The temperature throughout the polymerization was 76° C. A 3° C. exotherm was measured upon injection of the catalyst into the reactor. 29.4 Grams of polymer were recovered after 30 minutes. The results of this run are shown in Table 3.

EXAMPLE 19

Catalyst/support preparation

5 Grams of Sylopol type 948 silica were heated at 500° C. for 4 hours in an inert stream of nitrogen. The silica was transferred to an inert atmosphere glovebox where it was then treated with TEA. The silica was suspended in an amount of dry toluene followed by the slow addition of 684 mg of TEA. The amount of TEA which was added corresponded to a TEA/silica ratio of 1.2 mmoles/g silica. The silica was then washed several times with toluene to remove any soluble aluminum compounds.

An aliquot (200 μl) of a 0.005 M solution (1 μmol) of ($\eta^5$-$C_5Me_4SiMe_2NMe_3$)-Ti($\eta^4$-$C_5H_8$) in toluene was combined with 0.10 grams of the pretreated Sylopol 948 silica described above which had already been prewetted with ~200 μl of dry toluene. An aliquot (200 μl) of a 0.005 M solution (1.0 μl) of $B(C_6F_5)_3$ in toluene was then added to the slurried silica. The solvent was removed to give a free-flowing powder.

Polymerization

The catalyst described above was added to the semi-batch gas phase reactor which was under an ethylene pressure of 240 psi, a 1-butene pressure of 5.4 psi, an hydrogen pressure of 1.3 psi and a nitrogen pressure of 53 psi. The temperature throughout the run was 72° C. No exotherm was measured upon injection of the catalyst into the reactor. 24.1 Grams of polymer were recovered after 30 minutes. The results of this run are shown in Table 3.

EXAMPLE 20

An aliquot (200 μl) of a 0.005 M solution (1 μmol) of ($\eta^5$-$C_5Me_4SiMe_2NMe_3$)-Ti($\eta^4$-$C_5H_8$) in toluene was combined with 0.10 grams of the pretreated Sylopol 948 silica described above in Example 19 which had already been prewetted with ~200 µl of dry toluene. An aliquot (200 µl) of a 0.005 M solution (1 µmol) of $(C_{18}H_{37})_2(CH_3)NH$ $(C_6F_5)_4$ in toluene was then added to the slurried silica. The solvent was removed to give a free-flowing powder. The catalyst described above was added to the semi-batch gas phase reactor which was under an ethylene pressure of 240 psi, a 1-butene pressure of 5.4 psi, an hydrogen pressure of 1.3 psi and a nitrogen pressure of 53 psi. The temperature throughout the polymerization was 70° C. A 4° C. exotherm was measured upon injection of the catalyst into the reactor. 25.0 Grams of polymer were recovered after 30 minutes. The results of this run are shown in Table 3.

TABLE 2

Examples with (TI[IV]) formulated catalysts.

| Example | µmol catalyst/ gram silica | Cocatalyst/ Catalyst | mole catalyst/mole monomer × 10$^6$ | Normalized[1] Catalyst Efficiency |
|---|---|---|---|---|
| 1 | 480 | 1.0 | 0.286 | 3,000,000 |
| 2 | 480 | 2.0 | 0.572 | 3,000,000 |
| 3 | 300 | 3.0 | 0.364 | 4,200,000 |
| 4 | 200 | 3.0 | 0.26 | 2,350,000 |
| 5 | 100 | 1.25 | 0.598 | 4,000,000 |
| 6 | 60 | 3.0 | 0.364 | 6,100,000 |
| 7 | 30 | 3.0 | 0.364 | 23,423,000 |
| 8 | 10 | 1.0 | 0.130 | 28,165,000 |

[1]$g_{pe}/(mole_{metal} \cdot hour)$

TABLE 3

Examples with (Ti[II]) formulated catalysts.

| Example | µmol catalyst/ gram silica | Cocatalyst/ Catalyst | mole catalyst/mole monomer × 10$^6$ | Normalized[1] Catalyst Efficiency |
|---|---|---|---|---|
| 9 | 400 | 3.0 | 0.26 | 3,100,000 |
| 10 | 100 | 1.25 | 0.598 | 4,700,000 |
| 11 | 46 | 1.1 | 0.572 | 8,622,000 |
| 12 | 33 | 3.0 | 0.130 | 23,136,000 |
| 13 | 23 | 1.1 | 0.104 | 33,670,000 |
| 14 | 20 | 3.0 | 0.20 | 40,332,000 |
| 15 | 12 | 1.1 | 0.078 | 64,138,000 |
| 16 | 10 | 3.0 | 0.130 | 178,200,000 |
| 17 | 8 | 1.1 | 0.104 | 107,000,000 |
| 18 | 2 | 1.1 | 0.104 | 75,155,000 |
| 19 | 10 | 1.0 | 0.130 | 48,100,000 |
| 20 | 10 | 1.0 | 0.130 | 50,000,000 |

[1]$g_{pe}/(mole_{metal} \cdot hour)$

EXAMPLE 21

An aliquot (154 µl) of a 0.005 M solution (0.8 µmol) of $(\eta^5\text{-}C_5Me4SiMe_2NCMe_3)\text{-}Ti(\eta^4\text{-}C_5H_8)$ in toluene was combined with 0.1 grams of the pretreated Davison 948 silica described above in Example 1 which had already been prewetted with ~200 µl of dry toluene. An aliquot (176 µl) of a 0.005 M solution (0.9 µmol) of $B(C_6F_5)_3$ in toluene was then added to the slurried silica. The solvent was removed to give a free-flowing powder. The catalyst formulation was 8.0 mmol Ti/g silica with a cocatalyst/catalyst ratio=1.1. The catalyst described above was added to the semi-batch gas phase reactor which was under an ethylene pressure of 240 psi, a 1-butene pressure of 5.4 psi, an hydrogen pressure of 1.3 psi and a nitrogen pressure of 53 psi. The temperature throughout the polymerization was 76° C. A 4° C. exotherm was measured upon injection of the catalyst into the reactor. 25.5 Grams of polymer were recovered after 7 minutes. The results of this run are shown in Table 4.

EXAMPLE 22

An aliquot (308 µl) of a 0.005 M solution (1.5 µmol) of $(\eta^5\text{-}C_5Me_4SiMe_2NCMe_3)\text{-}Ti(\eta^4\text{-}C_5H_8)$ in toluene was combined with 0.2 grams of the pretreated Davison 948 silica described above in Example 1 which had already been prewetted with ~200 µl of dry toluene. An aliquot (352 µl) of a 0.005 M solution (1.8 µmol) of $B(C_6F_5)_3$ in toluene was then added to the slurried silica. The solvent was removed to give a free-flowing powder. The catalyst formulation was 7.5 mmol Ti/g silica with a cocatalyst/catalyst ratio=1.2. The catalyst described above was added to the semi-batch gas phase reactor which was under an ethylene pressure of 240 psi, a 1-butene pressure of 5.4 psi, an hydrogen pressure of 1.3 psi and a nitrogen pressure of 53 psi. The temperature throughout the polymerization was 75° C. A 10° C. exotherm was measured upon injection of the catalyst into the reactor. 37.9 Grams of polymer were recovered after 5 minutes. The results of this run are shown in Table 4.

EXAMPLE 23

An aliquot (193 µl) of a 0.005 M solution (1.0 µmol) of $(\eta^5\text{-}C_5Me_4SiMe_2NCMe_3)\text{-}Ti(\eta^4\text{-}C_5H_8)$ in toluene was combined with 0.1 grams of the pretreated Davison 948 silica described above in Example 1 which had already been prewetted with ~200 µl of dry toluene. An aliquot (578 µl) of a 0.005 M solution (3.0 µmol) of $B(C_6F_5)_3$ in toluene was then added to the slurried silica. The solvent was removed to give a free-flowing powder. The catalyst formulation was 10 mmol Ti/g silica with a cocatalyst/catalyst ratio=3. The catalyst described above was added to the semi-batch gas phase reactor which was under an ethylene pressure of 240 psi, a 1-butene pressure of 5.4 psi, an hydrogen pressure of 1.3 psi and a nitrogen pressure of 53 psi. The temperature throughout the polymerization was 77° C. A 4° C. exotherm was measured upon injection of the catalyst into the reactor. 29.6 Grams of polymer were recovered after 4.4 minutes. The results of this run are shown in Table 4.

TABLE 4

High Efficiency Catalyst System.

| Example | µmol catalyst/ gram silica | Cocatalyst/ Catalyst | mole catalyst/mole monomer × 10$^6$ | Normalized[1] Catalyst Efficiency |
|---|---|---|---|---|
| 21 | 8.0 | 1.1 | 0.18 | 268,240,000 |
| 22 | 7.5 | 1.2 | 0.33 | 311,350,000 |
| 23 | 10 | 3 | 0.22 | 402,360,000 |

[1]$g_{pe}/(mole_{metal} \cdot hour)$

Catalyst Preparations for Examples 24–26.

Preparation of Catalyst EG4. 17.0 kg of Crosfield ES70 silica (calcined at 500° C.) were slurried in 110 liters of hexane, 25.8 liters of 0.989M TEA in hexane were added, and the slurry agitated for 2 hours at 30° C. The silica was allowed to settle, and the supernatent hexane removed. The silica was washed several times with hexane, until the concentration of Al in the washing had reached <1 mmol Al/liter. Then the silica was dried in vacuo at 60° C.

3 g of this TEA treated ES70 silica were slurried in 15 ml of dry toluene, 0.34 ml of a 7.85 weight percent solution of tris(pentafluorophenyl)boron in toluene were added. The mixture was shaken well, and then 0.025 g of rac [1,2-ethanediylbis(1-indenyl)]zirconium s-trans($\eta^4$-trans,trans-1, 4-diphenyl-1,3-butadiene) was added as a solid. The solvent was removed in vacuo at 25° C. to give a red powder, having good flowability.

Preparation of Catalyst EG6. 20.0 kg of Crosfield ES70 silica (calcined at 500° C.) were slurried in 110 liters of hexane, 31.1 liters of 0.940M TEA in hexane were added, and the slurry agitated for 2 hours at 30° C. The silica was allowed to settle, and the supernatent hexane removed. The silica was washed several times with hexane, until the concentration of Al in the washing had reached <1 mmol Al/liter. Then the silica was dried in vacuo at 60° C.

3 g of this TEA treated ES70 silica were slurried in 15 ml of dry toluene, 0.69 ml of a 7.85 weight percent solution of tris(pentafluorophenyl)boron in toluene were added. The mixture was shaken well, and then 0.051 g of rac [1,2-ethanediylbis(1-indenyl)]zirconium s-trans($\eta^4$-trans,trans-1,4-diphenyl-1,3-butadiene) was added as a solid. The solvent was removed in vacuo at 25° C. to give a red powder, having good flowability.

Preparation of Catalyst PGD89. 100 g of the TEA treated ES70 silica described for EG6 were slurried in 350 ml of dry toluene. 11.30 ml of a 7.85 weight percent solution of tris(pentafluorophenyl)boron in toluene were added. The mixture was shaken well, and then 0.845 g of rac-[ 1,2-ethanediylbis(1-indenyl)]zirconium s-trans($\eta^4$-trans,trans-1,4-diphenyl-1,3-butadiene) was added as a solid. The solvent was removed in in vacuo at 35° C. to give a pink/red powder, having good flowability.

Polymerization Tests

EXAMPLE 24

324 g of NaCl was added to a 2.5 liter volume agitated dry phase reactor, which had been previously baked out at 85° C. under a $N_2$ purge, 0.944 g of a TEA treated silica was added to the reactor, and this was agitated for 15 minutes. The reactor was cooled to 70° C., and pressurized to 6.5 bar $C_2H_4$. Then 1-hexene was admitted to the reactor. A mixture of 0.230 g of catalyst Catalyst EG4 and 0.585 g of a TEA treated silica was injected into the reactor with high pressure $N_2$. The temperature, $C_2H_4$ pressure and 1-hexene levels were maintained constant during the rest of the test. The total polymerization time was 106 minutes. During the test, the average 1-hexane/$C_2H_4$ ratio was 0.0087. The reactor was vented and cooled, and 141 g of polymer was recovered after washing off the salt, giving an activity of 53.4 g/g cat.h.bar. The polymer density was 0.920 g/ml and $Ml_{2.16}$ was 3.16. The bulk density of the powder was 0.37 g/ml. The results of this run are shown in Table 5.

EXAMPLE 25

297 g of NaCl was added to a 2.5 liter volume agitated dry phase reactor, which had been previously baked out at 85° C. under a $N_2$ purge. 0.906 g of a TIBA treated silica was added to the reactor, and this was agitated for 15 minutes. The reactor was cooled to 70° C., and pressurized to 6.5 bar $C_2H_4$. Then 1-hexene was admitted to the reactor. A mixture of 0.219 g of catalyst Catalyst EG6 and 0.549 g of a TIBA treated silica was injected into the reactor with high pressure $N_2$. The temperature, $C_2H_4$ pressure and 1-hexene levels were maintained constant during the rest of the test. The total polymerization time was 182 minutes. During the test, the average 1-hexane/$C_2H_4$ ratio was 0.0085. The reactor was vented and cooled, and 194 g of polymer was recovered after washing off the salt, giving an activity of 44.9 g/g cat.h.bar. The polymer density was 0.922 g/ml and $Ml_{2.16}$ was 2.3 The bulk density of the powder was 0.37 g/ml. The results of this run are shown in Table 5.

EXAMPLE 26

281 g of NaCl was added to a 2.5 liter volume agitated dry phase reactor, which had been previously baked out at 85° C. under a $N_2$ purge. 0.977 g of a TIBA treated silica was added to the reactor, and this was agitated for 15 minutes. The reactor was cooled to 70° C., and pressurized to 6.5 bar $C_2H_4$. Then 1-hexene was admitted to the reactor. A mixture of 0.204 g of catalyst Catalyst PGD89 and 0.646 g of a TIBA treated silica was injected into the reactor with high pressure $N_2$. The temperature, $C_2H_4$ pressure and 1-hexene levels were maintained constant during the rest of the test. The total polymerization time was 88 minutes. During the test, the average 1-hexane/$C_2H_4$ ratio was 0.0087. The reactor was vented and cooled, and 90 g of polymer was recovered after washing off the salt, giving an activity of 46.3 g/g cat.h.bar. The polymer density was 0.915 g/ml and $Ml_{2.16}$ was 12.9. The bulk density of the powder was 0.39 g/ml. The results of this run are shown in Table 5.

TABLE 5

| | Examples with Zr catalyst systems. | | | |
|---|---|---|---|---|
| Example | μmol catalyst/ gram silica | Cocatalyst/ Catalyst | mole catalyst/mole monomer × 10⁶ | Normalized[1] Catalyst Efficiency |
| 24 | 15.0 | 1.0 | 5.98 | 23,000,000 |
| 25 | 30.0 | 1.0 | 11.39 | 14,600,000 |
| 26 | 15.0 | 1.0 | 5.30 | 20,000,000 |

[1]$g_{pe}/(mole_{metal}\cdot hour)$

EXAMPLES 27–31

Catalyst/Support Preparation

Approximately 50 g of Crosfield Type ES-70 silica were calcined in air at 500° C. for four hours in a flowing stream of nitrogen. The silica was cooled to 200° C., transferred to a 500 cc Schlenk flask with the Schlenk flask subsequently evacuated and transferred into an inert atmosphere glove box where the silica was treated with TEA. 20 g of the calcined silica were accurately weighed into a 200 cc Schlenk flask and enough hexane was added to make a slurry. 30.8 cc of 1 M TEA in hexane were added to the flask containing the slurried silica while swirling the flask by hand. After the addition of the TEA, the flask was allowed to stand, unagitated, for three hours. The treated silica was filtered, washed with several volumes of hexane and dried under vacuum at ambient temperature. 22.5 g of the TEA treated silica were recovered.

3 g of the treated silica were accurately weighed into each of five 100 cc Schlenk flasks. 15 cc of toluene were added to each flask to make a slurry. Aliquotes of a 0.025 M solution of Ethylene-bis-indenyl Zirconium Diphenylbutadiene (EBI-Zr-DPB) in toluene and a 0.10 M solution of borane in toluene were added to each flask and the solvent was removed under vacuum at ambient temperature while agitating each flask by hand. The nominal concentrations of EBI-Zr-DPB and FAB, in μmol/g, for each catalyst formulation are given in Table 6.

Polymerization

In each of five separate runs, 0.1 g of the above catalyst were added to an agitated dry phase reactor (ADPR) which was under an ethylene pressure of 7.4 bar, a nitrogen pressure of 1 bar, and a 1-hexene pressure of 0.04 bar. The average temperature throughout the 90 minute polymerization runs was 70° C. The polymerization results are shown below in Table 6.

TABLE 6

Examples with Zr catalyst systems.

| Example | μmol EBI-Zr-DPB catalyst/ gram silica | Cocatalyst/ Catalyst | mole catalyst/mole monomer × 10$^6$ | Normalized[1] Catalyst Efficiency |
|---|---|---|---|---|
| 27 | 15.0 | 1.0 | 2.28 | 18,300,000 |
| 28 | 15.0 | 2.0 | 2.28 | 27,200,000 |
| 29 | 22.5 | 1.0 | 3.42 | 21,600,000 |
| 30 | 30 | 0.5 | 4.56 | 13,600,000 |
| 31 | 30 | 1.0 | 4.56 | 11,200,000 |

[1]$g_{pe}/(mole_{metal} \cdot hour)$

For Examples 32–45, the mass of silica support required to give the desired metallocene loading was divided into two equal portions, the catalyst was supported on one portion and the appropriate amount of cocatalyst was supported on the other portion. The two portions of catalyst-containing silica and cocatalyst-containing silica, each of which was a free-flowing powder, were then mixed together and vigorously shaken for from 5 to 10 seconds. The mixture was then loaded into a catalyst injector and injected into the reactor.

EXAMPLE 32

Supported Catalyst Preparation 2 grams of Davison type 948 silica was calcined at 500° C. for 4 hours in an inert stream of nitrogen. The silica was transferred into an inert atmosphere glovebox where it was then treated with TEA. The silica was suspended in an amount of dry toluene followed by the slow addition of 2.4 mmoles of TEA. The amount of TEA which was added corresponded to a hydroxyl/TEA ratio of 1/1 (1.2 mmoles TEA/g silica). The silica was then washed several times with toluene to remove any residual soluble aluminum compounds.

200 μl of a 0.005 M solution (1 μmol) of ($\eta^5$-C$_5$Me$_4$SiMe$_2$NCMe$_3$)-Ti($\eta^4$-C$_5$H$_8$) in toluene was added to 0.1 grams of Davison 948 silica, which had been treated as described above, in 200 μl of dry toluene. The solvent was removed under reduced pressure to give a free-flowing powder.

Polymerization

The catalyst described above was added to the semi-batch gas phase reactor which was under an ethylene pressure of 240 psi, a 1-butene pressure of 5.4 psi, an hydrogen pressure of 1.3 psi and a nitrogen pressure of 53 psi. The temperature throughout the polymerization was 70° C. No exotherm was measured upon injection of the catalyst into the reactor. 0.0 grams of polymer were recovered after 30 minutes. The results of this run are shown in Table 7.

EXAMPLE 33

200 μl of a 0.005 M solution (1 μmol) of ($\eta^5$-C$_5$Me$_4$SiMe$_2$NCMe$_3$)-Ti($\eta^4$-C$_5$H$_8$) in toluene was added to 0.05 grams of the pretreated silica described in Example 32 in 200 μl of dry toluene. The solvent was removed to give a free-flowing powder. 100 μl of a 0.005 M solution (0.5 μmol) of B(C$_6$F$_5$)$_3$ in toluene was added to 0.05 grams of the pretreated silica described in Example 32 in 200 μl of dry toluene. The solvent was removed to give a free-flowing powder. The two portions of catalyst-containing silica and cocatalyst-containing silica, each of which was a free-flowing powder, were then mixed together and vigorously shaken for 5 to 10 seconds. The mixture was then loaded into a catalyst injector and injected into the semi-batch, gas phase reactor which was under an ethylene pressure of 240 psi, a 1-butene pressure of 5.4 psi, an hydrogen pressure of 1.3 psi and a nitrogen pressure of 53 psi. The temperature throughout the polymerization was 69° C. No exotherm was measured upon injection of the catalyst into the reactor. 13.6 grams of polymer were recovered after 30 minutes. The results of this run are shown in Table 7.

EXAMPLE 34

200 μl of a 0.005 M solution (1 μmol) of ($\eta^5$-C$_5$Me$_4$SiMe$_2$NCMe$_3$)-Ti($\eta^4$-C$_5$H$_8$) in toluene was added to 0.05 grams of the pretreated silica described in Example 32 in 200 μl of dry toluene. The solvent was removed to give a free-flowing powder. 200 μl of a 0.005 M solution (1 μmol) of B(C$_6$F$_5$)$_3$ in toluene was added to 0.05 grams of the pretreated silica described in Example 32 in 200 μl of dry toluene. The solvent was removed to give a free-flowing powder. The two portions of catalyst-containing silica and cocatalyst-containing silica, each of which was a free-flowing powder, were then mixed together and vigorously shaken for 5 to 10 seconds. The mixture was then loaded into a catalyst injector and injected into the semi-batch, gas phase reactor which was under an ethylene pressure of 240 psi, a 1-butene pressure of 5.4 psi, an hydrogen pressure of 1.3 psi and a nitrogen pressure of 53 psi. The temperature upon injection of the catalyst was 66° C. The temperature increased 4° C. during the first 5 minutes of polymerization then remained constant at 70° C. for the duration of the run. 22.2 grams of polymer were recovered after 30 minutes. The results of this run are shown in Table 7.

EXAMPLE 35

200 μl of a 0.005 M solution (1 μmol) of ($\eta^5$-C$_5$Me$_4$SiMe$_2$NCMe$_3$)-Ti($\eta^4$-C$_5$H$_8$) in toluene was added to 0.05 grams of the pretreated silica described in Example 32 in 200 μl of dry toluene. The solvent was removed to give a free-flowing powder. 200 μl of a 0.005 M solution (1 mol) of B(C$_6$F$_5$)$_3$ in toluene was added to 0.05 grams of the pretreated silica described in Example 32 in 200 μl of dry toluene. The solvent was removed to give a free-flowing powder. The two portions of catalyst-containing silica and cocatalyst-containing silica, each of which was a free-flowing powder, were then mixed together and vigorously shaken for 5 to 10 seconds. The mixture was then loaded into a catalyst injector and injected into the semi-batch, gas phase reactor which was under an ethylene pressure of 240 psi, a 1-butene pressure of 5.4 psi, an hydrogen pressure of 1.3 psi and a nitrogen pressure of 53 psi. The catalyst was injected at 66° C. followed by a 4° C. exotherm. The temperature remained at 69° C. for the duration of the polymerization. 25.5 grams of polymer were recovered after 30 minutes. The results of this run are shown in Table 7.

EXAMPLE 36

200 μl of a 0.005 M solution (1 μmol) of ($\eta^5$-CsMe$_4$SiMe$_2$NCMe$_3$)-Ti($\eta^4$-C$_5$H$_8$) in toluene was added to 0.05 grams of the pretreated silica described in Example 32 in 200 μl of dry toluene. The solvent was removed to give a free-flowing powder. 400 μl of a 0.005 M solution (2 μmol) of B(C$_6$F$_5$)$_3$ in toluene was added to 0.05 grams of the pretreated silica described in Example 32 in 200 μl of dry toluene. The solvent was removed to give a free-flowing powder. The two portions of catalyst-containing silica and cocatalyst-containing silica, each of which was a free-flowing powder, were then mixed together and vigorously shaken for 5 to 10 seconds. The mixture was then loaded into

EXAMPLE 37

200 μl of a 0.005 M solution (1 μmol) of ($\eta^5$-C$_5$Me$_4$SiMe$_2$NCMe$_3$)-Ti($\eta^4$-C$_5$H$_8$) in toluene was added to 0.05 grams of the pretreated silica described in Example 32 in 200 μl of dry toluene. The solvent was removed to give a free-flowing powder. The catalyst was loaded into a catalyst injector and injected into the semi-batch, gas phase reactor which was under an ethylene pressure of 240 psi, a 1-butene pressure of 5.4 psi, an hydrogen pressure of 1.3 psi and a nitrogen pressure of 53 psi. The temperature remained steady at 70° C. throughout the polymerization. 0.0 grams of polymer were recovered after 30 minutes. The results of this run are shown in Table 7.

EXAMPLE 38

400 μl of a 0.005 M solution (2 μmol) of ($\eta^5$-C$_5$Me$_4$SiMe$_2$NCMe$_3$)-Ti($\eta^4$-C$_5$H$_8$) in toluene was added to 0.05 grams of the pretreated silica described in Example 32 in 200 μl of dry toluene. The solvent was removed to give a free-flowing powder. 100 μl of a 0.005 M solution (0.5 μmol) of B(C$_6$F$_5$)$_3$ in toluene was added to 0.05 grams of the pretreated silica described in Example 32 in 200 μl of dry toluene. The solvent was removed to give a free-flowing powder. The two portions of catalyst-containing silica and cocatalyst-containing silica, each of which was a free-flowing powder, were then mixed together and vigorously shaken for 5 to 10 seconds. The mixture was then loaded into a catalyst injector and injected into the semi-batch, gas phase reactor which was under an ethylene pressure of 240 psi, a 1-butene pressure of 5.4 psi, an hydrogen pressure of 1.3 psi and a nitrogen pressure of 53 psi. The catalyst was injected at 68° C. followed by a 2° C. exotherm. The temperature remained steady at 70° C. for the during of the polymerization. 8.8 grams of polymer were recovered after 30 minutes. The results of this run are shown in Table 7.

EXAMPLE 39

200 μl of a 0.005 M solution (1 μmol) of ($\eta^5$-C$_5$Me$_4$SiMe$_2$NCMe$_3$)-Ti($\eta^4$-C$_5$H$_8$) in toluene was added to 0.025 grams of the pretreated silica described in Example 32 in 200 μl of dry toluene. The solvent was removed to give a free-flowing powder. 50 μl of a 0.005 M solution (0.25 μmol) of B(C$_6$F$_5$)$_3$ in toluene was added to 0.025 grams of the pretreated silica described in Example 32 in 200 μl of dry toluene. The solvent was removed to give a free-flowing powder. The two portions of catalyst-containing silica and cocatalyst-containing silica, each of which was a free-flowing powder, were then mixed together and vigorously shaken for 5 to 10 seconds. The mixture was then loaded into a catalyst injector and injected into the semi-batch, gas phase reactor which was under an ethylene pressure of 240 psi, a 1-butene pressure of 5.4 psi, an hydrogen pressure of 1.3 psi and a nitrogen pressure of 53 psi. The catalyst was injected at 68° C. followed by a 1° C. exotherm. The temperature remained steady at 69° C. for the during of the polymerization. 4.0 grams of polymer were recovered after 30 minutes. The results of this run are shown in Table 7.

EXAMPLE 40

200 μl of a 0.005 M solution (1 μmol) of ($\eta^5$-C$_5$Me$_4$SiMe$_2$NCMe$_3$)-Ti($\eta^4$C$_5$H$_8$) in toluene was added to 0.025 grams of the pretreated silica described in Example 32 in 200 μl of dry toluene. The solvent was removed to give a free-flowing powder. 100 μl of a 0.005 M solution (0.5 μmol) of B(C$_6$F$_5$)$_3$ in toluene was added to 0.025 grams of the pretreated silica described in Example 32 in 200 μl of dry toluene. The solvent was removed to give a free-flowing powder. The two portions of catalyst-containing silica and cocatalyst-containing silica, each of which was a free-flowing powder, were then mixed together and vigorously shaken for 5 to 10 seconds. The mixture was then loaded into a catalyst injector and injected into the semi-batch, gas phase reactor which was under an ethylene pressure of 240 psi, a 1-butene pressure of 5.4 psi, an hydrogen pressure of 1.3 psi and a nitrogen pressure of 53 psi. The catalyst was injected at 68° C. followed by a 2° C. exotherm. The temperature increased to 74° C. over the next 10 minutes then decreased to 69° C. over the last 20 minutes. 9.0 grams of polymer were recovered after 30 minutes. The results of this run are shown in Table 7.

EXAMPLE 41

400 μl of a 0.005 M solution (2 μmol) of ($\eta^5$-C$_5$Me$_4$SiMe$_2$NCMe$_3$)-Ti($\eta^4$-C$_5$H$_8$) in toluene was added to 0.05 grams of the pretreated silica described in Example 32 in 200 μl of dry toluene. The solvent was removed to give a free-flowing powder. 400 μl of a 0.005 M solution (2 μmol) of B(C$_6$F$_5$)$_3$ in toluene was added to 0.05 grams of the pretreated silica described in Example 32 in 200 μl of dry toluene. The solvent was removed to give a free-flowing powder. The two portions of catalyst-containing silica and cocatalyst-containing silica, each of which was a free-flowing powder, were then mixed together and vigorously shaken for 5 to 10 seconds. The mixture was then loaded into a catalyst injector and injected into the semi-batch, gas phase reactor which was under an ethylene pressure of 240 psi, a 1-butene pressure of 5.4 psi, an hydrogen pressure of 1.3 psi and a nitrogen pressure of 53 psi. The catalyst was injected at 66° C. The temperature increased to 74° C. over the next 11. 5.5 grams of polymer were recovered after 11 minutes. The results of this run are shown in Table 7.

EXAMPLE 42

200 μl of a 0.005 M solution (1 μmol) of ($\eta^5$-C$_5$Me$_4$SiMe$_2$NCMe$_3$)-Ti($\eta^4$-C$_5$B$_8$) in toluene was added to 0.025 grams of the pretreated silica described in Example 32 in 200 μl of dry toluene. The solvent was removed to give a free-flowing powder. 200 μl of a 0.005 M solution (1 μmol) of B(C$_6$F$_5$)$_3$ in toluene was added to 0.025 grams of the pretreated silica described in Example 32 in 200 μl of dry toluene. The solvent was removed to give a free-flowing powder. The two portions of catalyst-containing silica and cocatalyst-containing silica, each of which was a free-flowing powder, were then mixed together and vigorously shaken for 5 to 10 seconds. The mixture was then loaded into a catalyst injector and injected into the semi-batch, gas phase reactor which was under an ethylene pressure of 240 psi, a 1-butene pressure of 5.4 psi, an hydrogen pressure of 1.3 psi and a nitrogen pressure of 53 psi. The catalyst was injected at 70° C. followed by a 2° C. exotherm. The temperature remained steady at 72° C. for the during of the polymerization. 11.1 grams of polymer were recovered after 30 minutes. The results of this run are shown in Table 7.

EXAMPLE 43

200 μl of a 0.005 M solution (1 μmol) of ($\eta^5$-C$_5$Me$_4$SiMe$_2$NCMe$_3$)-Ti($\eta^4$-C$_5$H$_8$) in toluene was added to 0.025 grams of the pretreated silica described in Example 32 in 200 μl of dry toluene. The solvent was removed to give a free-flowing powder. 400 μl of a 0.005 M solution (2 μmol) of B(C$_6$F$_5$)$_3$ in toluene was added to 0.025 grams of the pretreated silica described in Example 32 in 200 μl of dry toluene. The solvent was removed to give a free-flowing powder. The two portions of catalyst-containing silica and cocatalyst-containing silica, each of which was a free-flowing powder, were then mixed together and vigorously shaken for 5 to 10 seconds. The mixture was then loaded into a catalyst injector and injected into the semi-batch, gas phase reactor which was under an ethylene pressure of 240 psi, a 2-butene pressure of 5.4 psi, an hydrogen pressure of 1.3 psi and a nitrogen pressure of 53 psi. The temperature throughout the polymerization was 71° C. No exotherm was measured upon injection of the catalyst into the reactor. 10.5 grams of polymer were recovered after 30 minutes. The results of this run are shown in Table 7.

EXAMPLE 44

200 μl of a 0.005 M solution (1 μmol) of ($\eta^5$-C$_5$Me$_4$SiMe$_2$NCMe$_3$)-Ti($\eta^4$-C$_5$H$_8$) in toluene was added to 0.025 grams of the pretreated silica described in Example 32 in 200 μl of dry toluene. The solvent was removed to give a free-flowing powder. The catalyst was loaded into a catalyst injector and injected into the semi-batch, gas phase reactor which was under an ethylene pressure of 240 psi, a 1-butene pressure of 5.4 psi, an hydrogen pressure of 1.3 psi and a nitrogen pressure of 53 psi. The temperature remained steady at 68° C. throughout the polymerization. 0.0 grams of polymer were recovered after 30 minutes. The results of this run are shown in Table 7.

EXAMPLE 45

400 μl of a 0.005 M solution (2 μmol) of ($\eta^5$-C$_5$Me$_4$SiMe$_2$NCMe$_3$)-Ti($\eta^4$-C$_5$H$_8$) in toluene was added to 0.025 grams of the pretreated silica described in Example 32 in 200 μl of dry toluene. The solvent was removed to give a free-flowing powder. 400 μl of a 0.005 M solution (2 μmol) of B(C$_6$F$_5$)$_3$ in toluene was added to 0.025 grams of the pretreated silica described in Example 32 in 200 μl of dry toluene. The solvent was removed to give a free-flowing powder. The two portions of catalyst-containing silica and cocatalyst-containing silica, each of which was a free-flowing powder, were then mixed together and vigorously shaken for 5 to 10 seconds. The mixture was then loaded into a catalyst injector and injected into the semi-batch, gas phase reactor which was under an ethylene pressure of 240 psi, a 1-butene pressure of 5.4 psi, an hydrogen pressure of 1.3 psi and a nitrogen pressure of 53 psi. The temperature throughout the polymerization was 69° C. No exotherm was measured upon injection of the catalyst into the reactor. 18.3 grams of polymer were recovered after 30 minutes. The results of this run are shown in Table 7.

TABLE 7

Examples with separately supported catalyst systems

| Example | μmol catalyst/ gram silica | Cocatalyst/ Catalyst | mole catalyst/mole monomer × 10$^6$ | Normalized Catalyst Efficiency[1] |
|---|---|---|---|---|
| 32 | 10 | 0 | 0.130 | 0 |
| 33 | 10 | 0.5 | 0.130 | 27,200,000 |
| 34 | 10 | 1.0 | 0.130 | 44,300,000 |
| 35 | 10 | 1.0 | 0.130 | 51,000,000 |
| 36 | 10 | 2.0 | 0.130 | 72,000,000 |
| 37 | 20 | 0 | 0.130 | 0 |
| 38 | 20 | 0.25 | 0.260 | 8,800,000 |
| 39 | 20 | 0.25 | 0.130 | 8,000,000 |
| 40 | 20 | 0.5 | 0.130 | 18,000,000 |
| 41 | 20 | 1.0 | 0.260 | 14,500,000 |
| 42 | 20 | 1.0 | 0.130 | 22,200,000 |
| 43 | 20 | 2.0 | 0.130 | 21,000,000 |
| 44 | 40 | 0 | 0.130 | 0 |
| 45 | 40 | 1.0 | 0.260 | 18,300,000 |

[1] g$_{pe}$/(mole$_{metal}$·hour)

What is claimed is:

1. A process for the polymerization of an olefin monomer, or of an olefin monomer and one or more comonomers, to produce a polymer, the process carried out in a polymerization reactor in the presence of a supported olefin polymerization catalyst system produced form catalyst components comprising:
   1) a support material component comprising one or more dehydrated support materials;
   2) a metallocene complex component comprising one or more metallocene complexes used in a total loading range of from about 0.1 to about 25 μmol of metallocene complex/gram of support material component.

2. A process for the polymerization of an olefin monomer, or of an olefin monomer and one or more comonomers, to produce a polymer, the process carried out in a polymerization reactor in the presence of a supported olefin polymerization catalyst system produced from catalyst components comprising:
   1) a support material component comprising one or more dehydrated support materials:
   2) a metallocene complex component comprising one or more metallocene complexes all of which have as a central metal Ti used in a total loading range of from about 0.1 to about 25 μmol of metallocene complex/gram of support material component;
   3) an activator component comprising one or more activators used in a range of molar ratios of total moles of activator to total moles of metallocene complex f from about 0.5 to about 2.5;

where a catalyst efficiency results that is at least 2.4×10$^7$ g polymer/mol catalyst/hour.

3. The process of one of claims 1–2, wherein the metallocene complex component is used in a loading range of from about 0.3 to about 20 μmol/gram of support material component.

4. The process of claim 3, wherein the metallocene complex component is used in a loading range of from about 1 to about 20 μmol/gram of support material component.

5. The process of one of claims 1–2, wherein the activator component is used in a range of molar ratios to the metallocene complex component of from about 1 to about 2.

6. The process of claim 5, wherein the activator component is used in a range of molar ratios to the metallocene complex component of from about 1 to about 1.5.

7. The process of claim 1, wherein the catalyst system is used in the reactor at a catalyst concentration in the range of about 0.02×10$^{-6}$ to about 3×10$^{-6}$ moles of active catalyst/mole of monomer.

8. The process of claim 7, wherein the catalyst system is used in the reactor at a catalyst concentration in the range of about $0.05 \times 10^{-6}$ to about $3 \times 10^{-6}$ moles of active catalyst/mole of monomer.

9. The process of claim 8, wherein the catalyst system is used in the reactor at a catalyst concentration in the range of about $0.1 \times 10^{-6}$ to about $3 \times 10^{-6}$ moles of active catalyst/mole of monomer.

10. The process of one of claims 1–2, wherein the catalyst efficiency is greater than $4.8 \times 10^7$ g polymer/mole catalyst/hour.

11. The process of claim 10, wherein the catalyst efficiency is greater than 10 $9.6 \times 10^7$ g polymer/mole catalyst/hour.

12. The process of claim 11, wherein the catalyst efficiency is greater than $14.4 \times 10^7$ g polymer/mole catalyst/hour.

13. The process of claim 12, wherein the catalyst efficiency is greater than $24 \times 10^7$ g polymer/mole catalyst/hour.

14. The process of one of claims 1–2, wherein the metallocene complex component has been produced with a mono-Cp metallocene complex.

15. The process of claim 14, wherein the metallocene complex component has been produced with a metallocene complex of the formula:

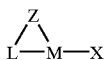

wherein:

M is titanium or zirconium in the +2 formal oxidation state;

L is a group containing a cyclic, delocalized anionic, η-system through which the group is bound to M. and which group is also bound to Z;

Z is a moiety bound to M via a σ-bond, comprising an element selected from the group consisting of boron and the members of Group 14 of the Periodic Table of the Elements, and also comprising an element selected from the group consisting of nitrogen, phosphorus. sulfur and oxygen, said moiety having up to 60 non-hydrogen atoms; and X is a neutral, conjugated or nonconjugated diene, optionally substituted with one or more groups selected from hydrocarbyl or trimethylsilyl groups, said X having up to 40 carbon atoms and forming a π-complex with M.

16. The process of claim 1 or claim 2, wherein the mono-Cp metallocene complex has as a central metal Ti in which the formal oxidation state is +3 or +4.

17. The process of one of claim 1–2, wherein the metallocene complex component has been produced with a bis-Cp metallocene complex.

18. The process of claim 17, wherein the metallocene complex component has been produced with a bridged bis-Cp metallocene complex.

19. The process of claim 18, wherein the metallocene complex component has been produced with a metallocene complex of the formula:

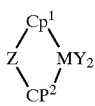

wherein $Cp^1$, $Cp^2$ are independently a substituted or unsubstituted indenyl or hydrogenated indenyl group;

Y is a univalent anionic ligand or $Y_2$ is a diene;

M is zirconium, titanium or hafnium; and

Z is a bridging, group comprising an alkylene group having, 1 to 20 carbon atoms or a dialkylsilyl or dialkylgermyl group, or alkylphosphine or alkylamine radical.

20. The process of one of claims 1–2, wherein the metallocene complex component has been produced with a single metallocene complex.

21. The process of one of claims 1–2, wherein the metallocene complex component has been produced with two or more metallocene complexes, or has been produced with at least one metallocene complex and at least one nonmetallocene catalyst.

22. The process of one of claims 1–2, wherein the support material component comprises a polymer, an inorganic oxide, a metal halide, a prepolymerized polymeric substrate or a mixture thereof.

23. The process of claim 22, wherein the support material component comprises an inorganic oxide.

24. The process of claim 23, wherein the support material component comprises silica, alumina, silica-alumina, or a mixture thereof.

25. The process of claim 24, wherein the support material component comprises silica, alumina, silica-alumina, or a mixture thereof which has been modified with $TiO_2$, $ZrO_2$, $GeO_2$, $B_2O_3$, or a mixture thereof.

26. The process of claim 22, wherein the support material component comprises a polymer.

27. The process of one of claims 1–2, wherein the activator component comprises a cocatalyst.

28. The process of claim 27, wherein the cocatalyst is tris(pentafluorophenyl)borane, N-$R_3$,N-$R_4$ anilinium tetrakis(pentafluorophenyl)borate where $R_3$ and $R_4$ independently each occurrence are substituted or unsubstituted saturated hydrocarbyl groups having from 1 to 8 carbon atoms, $(R_1R_2NHCH_3)^+(C_6H_4OH)B(C_6F_5)_3^-$, or $(R_1R_2NHCH_3)^+B(C_6F_5)_4^-$, where $R_1$ and $R_2$ independently each occurrence are substituted or unsubstituted saturated hydrocarbyl groups having from 12 to 30 carbon atoms.

29. The process of one of claims 1–2, wherein the catalyst system has been produced so that it contains alumoxane in a nonactivating concentration.

30. The process of one of claims 1–2, wherein the catalyst system has been produced so that it is essentially alumoxane-free.

31. The process of one of claims 1–2, wherein one or more of the catalyst components or the catalyst system as a whole has been prepolymerized.

32. The process of one of claims 1–2, wherein ethylene is the monomer and the comonomer is propene, 2-butene, 1-pentene, 4-methyl-1-hexadiene, 1,4-pentadiene, 1,9-decadiene, ethylidenenorbornene, styrene, methylstyrene, or a mixture thereof.

33. The process of one of claims 1–2, wherein propene is the monomer and the comonomer is ethylene, 1-butene, 1-pentene, 4-methyl-1-pentene, 1-hexene, 1-heptene, 1-octene, 1-nonene, 1-decene, 1,7-octadiene, 1,5-hexadiene, 1,4-pentadiene, 1,9-decadiene, ethylidenenorbornene, styrene, methylstyrene, or a mixture thereof.

34. The process of one of claims 1–2, wherein the process is a continuous process conducted in a single gas phase reactor.

35. The process of claim 34, wherein the process is conducted in gas phase reactor operating in condensed mode.

36. The process of one of claims 1–2, wherein the process is a continuous process conducted in a single slurry reactor.

37. The process of one of claims 1–2, wherein the process is carried out in two or more reactors, optionally in the presence of one or more additional metallocene or nonmetallocene catalyst systems.

38. The process of one of claims 1–2, wherein the polymer is produced in a reactor with a reaction zone having a temperature of 60° C. or higher.

39. The process of claim 38, wherein the polymer is produced in a reactor with a reaction zone having a temperature of 70° C. or higher.

40. The process of claim 39, wherein the polymer is produced in a reactor with a reaction zone having a temperature of 80° C. or higher.

41. The process of one of claims 1–2, wherein the polymerization is a copolymerization of ethylene or propylene as the monomer and of one or more α-olefin comonomers at a comonomer to monomer molar ratio which is less than 0.1.

42. The process of claim 41, wherein the polymerization is a copolymerization of ethylene or propylene as the monomer and of one or more α-olefin comonomers at a comonomer to monomer molar ratio which is less than 0.05.

43. The process of claim 42, wherein the polymerization is a copolymerization of ethylene or propylene as the monomer and of one or more α-olefin comonomers at a comonomer to monomer molar ratio which is less than 0.02.

44. The process of one of claims 1–2, wherein the polymerization reactor contains hydrogen in a hydrogen to monomer molar ratio which is less than 0.05.

45. The process of claim 44, wherein the polymerization reactor contains hydrogen in a hydrogen to monomer molar ratio which is less than 0.02.

46. The process of claim 45, wherein the polymerization reactor contains hydrogen in a hydrogen to monomer molar ratio which is less than 0.01.

47. The process of one of claims 1–2, wherein the density of the polymer is from about 0.85 to about 0.98, the comonomer to monomer molar ratio is less than 0.1, the hydrogen to monomer ratio is less than 0.05, and the composition is produced in a reactor with a reaction zone having a temperature of 70° C. or higher.

48. The process of claim 47, wherein the density of the polymer is from about 0.910 to about 0.925, the comonomer to monomer molar ratio is less than 0.02, the hydrogen to monomer ratio is less than 0.02, and the composition is produced in a reactor with a reaction zone having a temperature of 70° C. or higher.

49. The process of one of claims 1–2, wherein the catalyst system is produced outside the reactor by combining the catalyst components in any order by either a wet impregnation method or a dry impregnation method.

50. The process of one of claims 1–2, wherein the catalyst components are produced outside the reactor, the process comprising:

1) depositing one or more metallocene complexes on individual metallocene support portions of the support material component or on a common metallocene support to form one or more individually supported metallocene complex components;

2) depositing one or more cocatalysts on individual cocatalyst support portions of the support material component or on a common cocatalyst support to form one or more individually supported cocatalyst components; and 3) combining together in any order one or more of the metallocene components from 1) and the cocatalyst components from 2) to from the catalyst system prior to introduction of the catalyst system into the reactor; or 4) introducing one or more of the individually supported metallocene components from 1) and the individually supported cocatalyst components from 2) into the reactor individually.

51. A supported olefin polymerization catalyst system produced from catalyst components comprising:

1) a support material component comprising one or more dehydrated support materials;

2) a metallocene complex component; and 3) an activator component;

wherein the metallocene complex component is used in a loading range of from about 0.1 to about 25 μmol/gram of support material component, the cocatalyst or activator component is used in a range of molar ratios to the metallocene complex component of from about 0.5 to about 2.5, and, when the catalyst system is used in a reactor to polymerize one or more olefin monomers to produce a polymer, the catalyst system is used at a catalyst concentration in the range of about $0.1 \times 10^{-6}$ to about $6 \times 10^{-6}$ moles of active catalyst/mole of monomer, and a catalyst efficiency results that is at least $2.4 \times 10^7$ g polymer/mole of catalyst/hour.

52. The catalyst system of claim 51, wherein a) the metallocene complex component comprises one or more metallocene complexes supported on individual metallocene supports or a common metallocene support; and b) the activator component comprises one or more activators supported on individual activator supports or a common activator support, where at least one of the activators is a non-alumoxane nonionic activator.

53. The catalyst system of claim 52, wherein each of the supports independently comprises a polymer, an inorganic oxide, a metal halide or a mixture thereof.

54. The catalyst system of claim 53, wherein one or more of the supports comprises an inorganic oxide.

55. The catalyst system of claim 54, wherein one or more of the supports comprises silica, alumina, silica-alumina, or a mixture thereof.

56. The catalyst system of claim 55, wherein one or more of the supports comprises silica, alumina, silica-alumina, or a mixture thereof which has been modified with $TiO_2$, $ZrO_2$, $GeO_2$, $B_2O_3$, or a mixture thereof.

57. The catalyst system of claim 52, wherein all of the activators are non-alumoxane nonionic activators.

* * * * *

UNITED STATES PATENT AND TRADEMARK OFFICE
CERTIFICATE OF CORRECTION

PATENT NO. : 6,479,599 B1
DATED : December 12, 2002
INVENTOR(S) : Kevin P. Peil et al.

It is certified that error appears in the above-identified patent and that said Letters Patent is hereby corrected as shown below:

Column 50,
Line 24, "form" should read -- from --.
Line 31, "component." should read -- component; --.

3)      an activator component comprising one or more activators used in a range of molar ratios of total moles of activator to total moles of metallocene complex of from about 0.5 to about 2.5;

where the catalyst system is used at a catalyst concentration in the range of from about $0.01 \times 10^{-6}$ to about $6 \times 10^{-6}$ moles of active catalyst/mole of monomer, and a catalyst efficiency results that is at least $2.4 \times 10^7$ g polymer/mol catalyst/hour. --
Line 39, "materials:" should read -- materials; --.
Line 47, "f from" should read -- of from --.

Column 50,
Line 39, "materials:" should read -- materials; --.
Line 47, "f from" should read -- of from --.

Column 51,
Line 12, after "than", delete "10".
Line 34, "η-system" should read -- π-system --.
Line 34, "to M." should read -- to M, --.
Line 40, "phosphorus." should read -- phosphorus, --.
Line 50, "claim" should read -- claims --.

Column 52,
Line 3, after "bridging", delete the comma.
Line 4, after "having", delete the comma.
Line 50, "2-butene" should read -- 1-butene --.
Line 51, "4-methyl-1-hexadiene, 1,4-pentadiene," should read
-- 4-methyl-1-pentene, 1-hexene, 1-heptene, 1-octene, 1-nonene, 1-decene, 1,7-octadiene, 1,5-hexadiene, 1,4-pentadiene, --.

UNITED STATES PATENT AND TRADEMARK OFFICE
CERTIFICATE OF CORRECTION

PATENT NO. : 6,479,599 B1
DATED : December 12, 2002
INVENTOR(S) : Kevin P. Peil et al.

It is certified that error appears in the above-identified patent and that said Letters Patent is hereby corrected as shown below:

Column 54,
Line 8, "to from" should read -- to form --.

Signed and Sealed this

Fifth Day of August, 2003

JAMES E. ROGAN
*Director of the United States Patent and Trademark Office*